US011212420B2

(12) United States Patent
Nagano et al.

(10) Patent No.: US 11,212,420 B2
(45) Date of Patent: Dec. 28, 2021

(54) METHODS AND SYSTEM FOR POLICY-BASED SCANNING USING A PUBLIC PRINT SERVICE

(71) Applicant: Kyocera Document Solutions, Inc., Osaka (JP)

(72) Inventors: Daisaku Nagano, Pleasant Hill, CA (US); Hiroyuki Takaishi, Pleasant Hill, CA (US); Tai Yu Chen, Dublin, CA (US); Jin Liang, Dublin, CA (US); Michael Ong Martin, Pacheco, CA (US)

(73) Assignee: Kyocera Document Solutions, Inc., Osaka (JP)

( * ) Notice: Subject to any disclaimer, the term of this patent is extended or adjusted under 35 U.S.C. 154(b) by 0 days.

(21) Appl. No.: 17/080,027

(22) Filed: Oct. 26, 2020

(65) Prior Publication Data

US 2021/0044720 A1 Feb. 11, 2021

Related U.S. Application Data

(63) Continuation-in-part of application No. 16/452,038, filed on Jun. 25, 2019, now Pat. No. 10,942,688, and a continuation-in-part of application No. 16/451,913, filed on Jun. 25, 2019, now Pat. No. 10,817,230, and a continuation-in-part of application No. 16/452,041, filed on Jun. 25, 2019, now Pat. No. 10,929,548.

(51) Int. Cl.
*H04N 1/44* (2006.01)
(52) U.S. Cl.
CPC ......... *H04N 1/4426* (2013.01); *H04N 1/4433* (2013.01)

(58) Field of Classification Search
CPC .......................... H04N 1/4426; H04N 1/4433
USPC ......................................... 358/1.14
See application file for complete search history.

(56) References Cited

U.S. PATENT DOCUMENTS

| 7,861,282 | B2 | 12/2010 | Kakigi |
| 9,461,820 | B1 | 10/2016 | Dall |
| 2002/0161831 | A1 | 10/2002 | Nakaoka et al. |
| 2007/0107048 | A1 | 5/2007 | Halls |
| 2007/0156659 | A1 | 7/2007 | Lim |
| 2008/0034403 | A1 | 2/2008 | Kakigi |

(Continued)

OTHER PUBLICATIONS

USPTO form-892 from co-pending U.S. Appl. No. 17/079,987 dated Jul. 31, 2021 (1 page).

*Primary Examiner* — Allen H Nguyen
(74) *Attorney, Agent, or Firm* — Millen, White, Zelano & Branigan, P.C.; William Nixon

(57) ABSTRACT

A policy-based system is implemented to allow access to a private domain to print using a public domain. The private domain includes private servers that store documents. The public domain includes servers and a printing device. A public policy server uses a domain list and a protocol connection with a private authentication server to validate a user and identify which private domain to access. The public policy server receives requests from the printing device to process a print job of a document in the private domain. The policy-based system also determines whether scanning operations for a document are allowed for a public scan service using remaining credit values and the policy. The public scan service is cloud-based and includes a public server to interact with printing devices through the cloud-based service.

20 Claims, 18 Drawing Sheets

(56) References Cited

U.S. PATENT DOCUMENTS

| | | | |
|---|---|---|---|
| 2009/0271839 A1* | 10/2009 | Kanai | H04N 1/4406 726/1 |
| 2012/0024943 A1* | 2/2012 | Kangas | G06K 19/06009 235/375 |
| 2012/0064204 A1* | 3/2012 | Davila | H04N 1/00188 426/231 |
| 2013/0094053 A1 | 4/2013 | Shirai | |
| 2014/0063531 A1 | 3/2014 | Deter | |
| 2014/0283062 A1 | 9/2014 | Kamthe | |
| 2015/0248258 A1 | 9/2015 | Ding | |
| 2015/0363139 A1 | 12/2015 | Ishihara | |
| 2017/0251009 A1 | 8/2017 | Irimie | |
| 2018/0096155 A1 | 4/2018 | Ryu et al. | |
| 2018/0376015 A1 | 12/2018 | Hokiyama | |
| 2019/0004752 A1 | 1/2019 | Yamada | |

* cited by examiner

| | | |
|---|---|---|
| Private Domain 120 | @example1.com | ─402 |
| | @example2.com | ─404 |
| Private Domain 130 | @company.com | ─406 |
| Private Domain N | @firm.com | ─408 |
| Private Domain N+1 | @college.com | ─410 |
| Private Domain X | @website.com | ─412 |

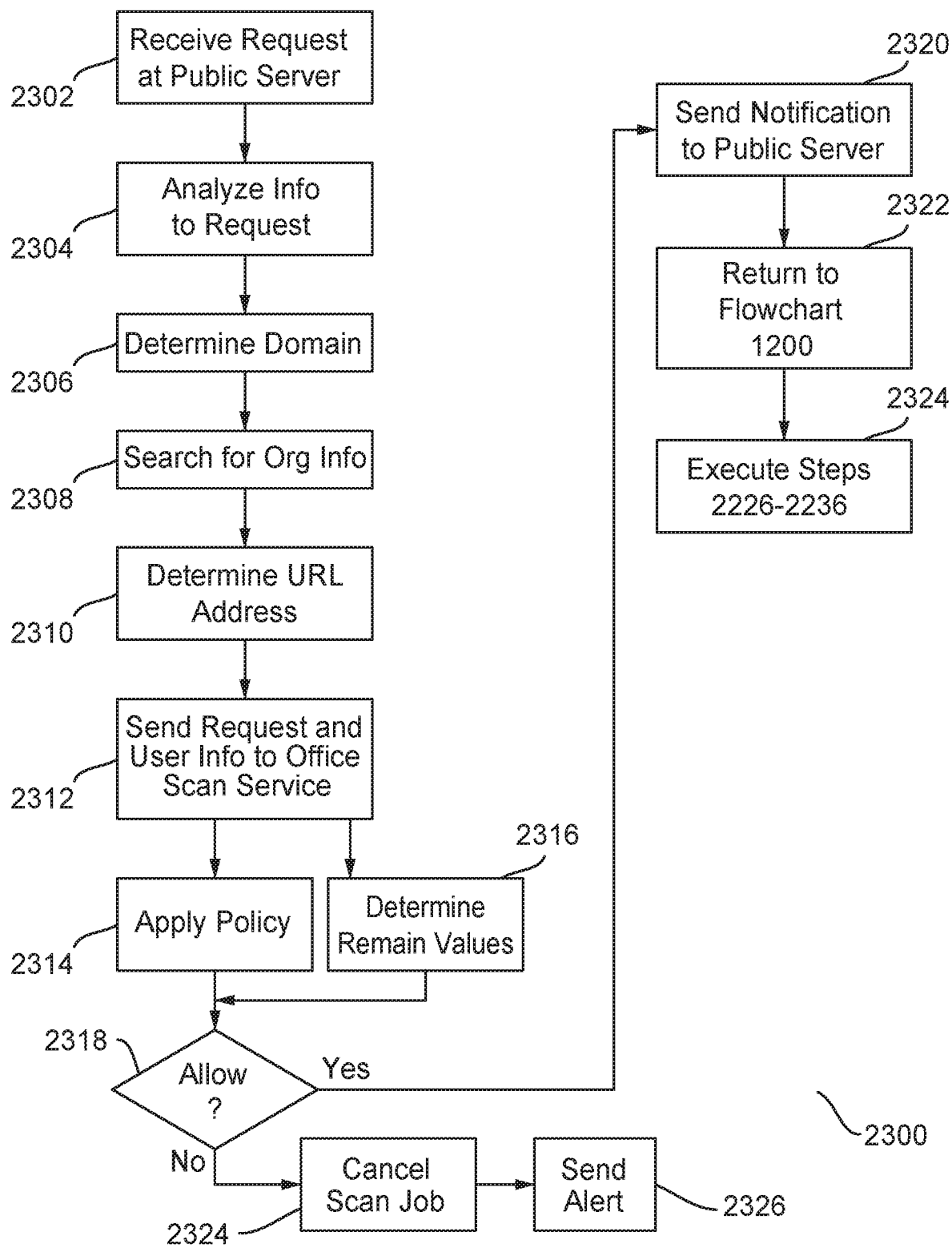

METHODS AND SYSTEM FOR POLICY-BASED SCANNING USING A PUBLIC PRINT SERVICE

FIELD OF THE INVENTION

The present invention relates to a method of using a public server to implement policy-based printing operations. The system includes a public network that supports the policy used for scanning operations, wherein the policy is implemented in conjunction with a public scan service.

DESCRIPTION OF THE RELATED ART

Existing policy-based printing and scanning systems mostly operate within a closed private domain environment. Print and scan data submitted by users may be only accessible within a single domain environment. Some users, such as on-the-go users including insurance and real estate agents, sales executives, lawyers, and company executives, require the capability to access printing data beyond an office environment. These users travel extensively and find themselves needing to print or scan documents in public locations, such as convenience stores, libraries, airports, copy and printing service stores, and the like. At these locations, the users may not reliably access the printing data. Further, these public locations may not support policy-based printing or scanning.

SUMMARY OF THE INVENTION

A policy-based scanning method is disclosed. The policy-based scanning method includes receiving a request with information for a scan job for a document at a cloud-based public server within a cloud-based public scan service. The information corresponds to a user within an organization. The policy-based scanning method also includes determining a domain for the organization based on the information. The policy-based scanning method also includes applying a policy for the organization at the public server according to the domain. The policy-based scanning method also includes determining a remaining credit value for the user using a ledger at the public server. The policy-based scanning method also includes determining whether to allow the scan job of the document based on the policy and if the remaining credit value is greater than a cost for the scan job within the public scan service. The policy-based scanning method also includes receiving a notification to proceed with the scan job of the document at a scanning device based on the determination whether to allow. The policy-based scanning method also includes scanning the document at the scanning device.

A policy-based scanning method is disclosed. The policy-based scanning method includes accessing a cloud-based public scan service. The policy-based scanning method also includes receiving a request with information for a scan job of a document at a cloud-based public server connected to the public scan service. The information corresponds to a user within an organization. The policy-based scanning method also includes processing the request for the scan job at the public server by determining a domain for the organization based on the information, applying a policy and a remaining credit value to the scan job for the organization within the public scan service according to the domain, determining whether to allow the scan job within the public scan service of the document based on the policy and the remaining credit value, and sending a notification to a scanning device to proceed with the scan job of the document using the public scan service based on the determination whether to allow. The policy-based scanning method also includes scanning the document at the scanning device.

A policy-based scanning system is disclosed. The policy-based scanning system includes a cloud-based public scan service connected to a scanning device to scan a document. The policy-based scanning system also includes a cloud-based public server within the public scanning service. The public server is configured to receive a request for a scan job for the document. The public server includes a policy and a ledger to store a remaining credit value for an organization subscribed to the public scan service. The public server is configured to apply the policy and the remaining credit value to allow the scan job using the public scanning service. The public server is configured to receive the document from the scanning device if the scan job is allowed by the policy and the remaining credit value. The scanning device is configured to scan the document upon receipt of a notification from the public server.

A policy-based scanning method is disclosed. The policy-based scanning method includes receiving a request with information for a scan job for a document at a public server from a scanning device. The information corresponds to a user within an organization. The policy-based scanning method also includes determining a domain for the organization based on the information. The policy-based scanning method also includes applying a policy at a private server for the organization according to the domain. The policy-based scanning method also includes determining a remaining credit value for the user using a ledger at the private server. The policy-based scanning method also includes determining whether to allow the scan job of the document based on the policy and if the remaining credit value is greater than a cost for the scan job. The policy-based scanning method also includes receiving a notification to proceed with the scan job of the document at the scanning device based on the determination whether to allow. The policy-based scanning method also includes scanning the document at the scanning device.

A policy-based scanning method is disclosed. The policy-based scanning method includes receiving a request with information for a scan job of a document at a scanning device. The information corresponds to a user within an organization. The policy-based scanning method also includes determining whether the scan job is through a public scan service connected to the scanning device. If the scan job is through the public scan service, then the policy-based scanning method also includes processing the request for the scan job at a public server by determining a domain for the organization based on the information, applying a policy and remaining credit value for the organization according to the domain, determining whether to allow the scan job of the document based on the policy and the remaining credit value, and sending a notification to the public server to proceed with the scan job of the document based on the determination whether to allow. If the scan job is not through the public scan service, then the policy-based scanning method also includes applying the policy at the private server for the organization, determining whether to allow the scan job of the document based on the policy, and instructing the scanning device to proceed with the scan job based on the determination whether to allow. The policy-based scanning method also includes scanning the document at the scanning device.

A policy-based scanning system is disclosed. The policy-based scanning system includes a scanning device to scan a document. The policy-based scanning system also includes a public server to support a public scan service for an organization. The public server is configured to receive a request for a scan job for the document from the scanning device. The policy-based scanning system also includes a private server connected to the public server. The private server includes a policy and a ledger to store a remaining credit value for the organization. The private server is configured to apply the policy to allow the scan job and the remaining credit value for the scan job using the public scan service. The public server is configured to receive the document from the scanning device if the scan job is allowed by the policy and the remaining credit value.

BRIEF DESCRIPTION OF THE DRAWINGS

Various other features and attendant advantages of the present invention will be more fully appreciated when considered in conjunction with the accompanying drawings.

FIG. 4A illustrates a domain list for use within the policy-based printing system according to the disclosed embodiments.

FIG. 17 illustrates a flowchart for scanning the document using the public scan service according to the disclosed embodiments.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments use an authentication server, a policy server, a file server, a network enabled printing device, and a public domain server. At the printing device, a user may provide authentication information, such as a username or password. The authentication information is transmitted from the device to a public domain server that processes the username for domain information. The domain information is matched to a domain on record and a private server is identified that can handle the domain authentication. The public domain server, through a direct connection to the private server, will go through a series of steps to obtain an authentication token, a policy applicable to the user, a job list of the user, and the job binary data for printing a print job on the printing device.

Figure 1:
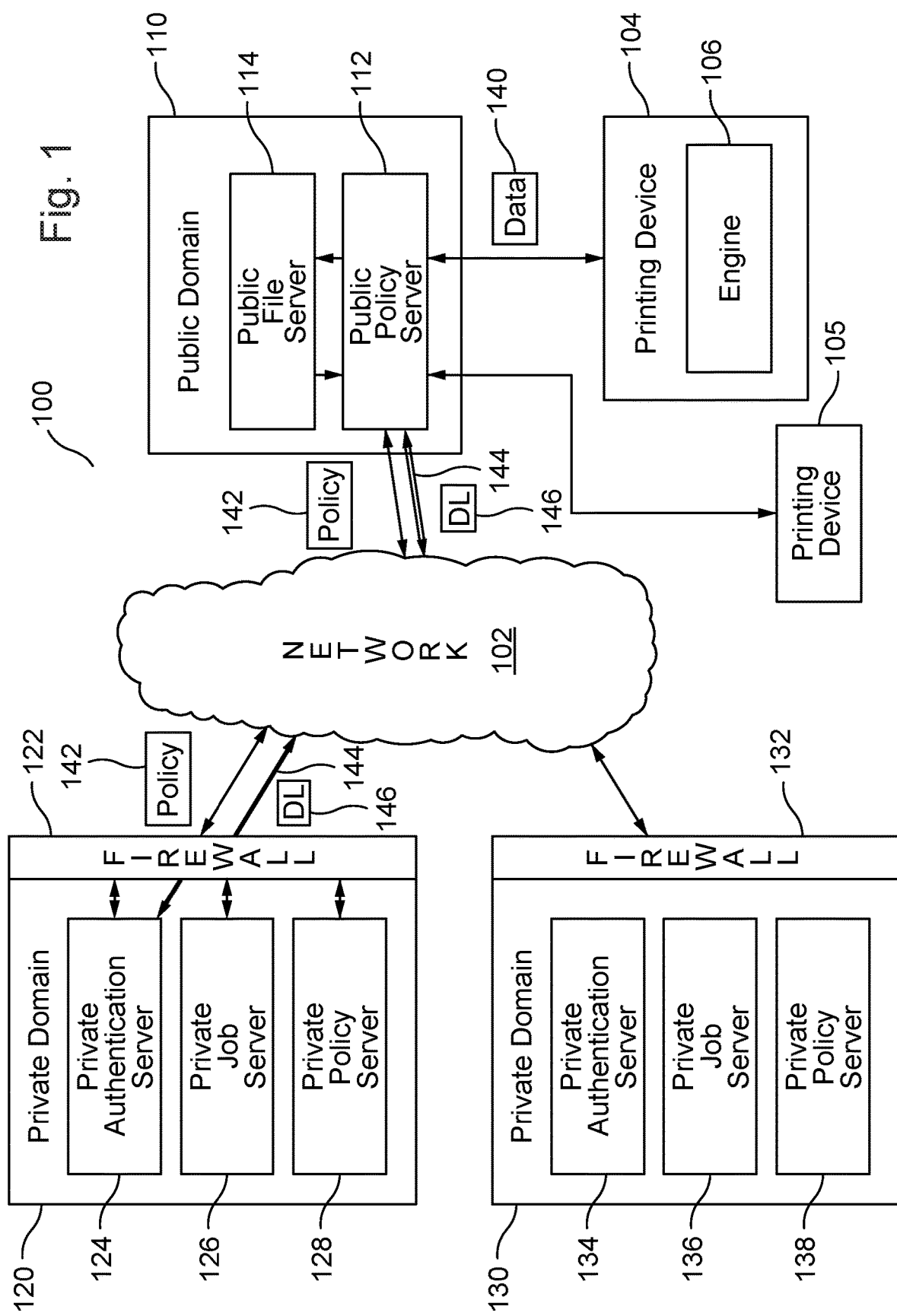
FIG. 1 depicts a system to implement policy-based printing on a printing device according to the disclosed embodiments.

FIG. 1 depicts a system 100 to implement policy-based printing on a printing device 104 according to the disclosed embodiments. System 100 includes network 102 which exchanges data between the public and private domains within system 100. System 100 allows a user to retrieve a print job having job binary data 140 from a private domain server to print on printing device 104. Printing device 104 may be any device that processes the binary data to generate an electronic document that is then printed or accessed by the user. Printing device 104 also may be known as an image forming apparatus or a multi-functional printer. For example, printing device 104 may print on a sheet of paper the document generated from binary data 140. Alternatively, printing device 104 may display the electronic document to the user. Printing device 104 also may store the binary data for the print job. Printing device includes engine 106, which performs many of the operations to print, scan, store, modify, and the like. Printing device 104 and engine 106 are disclosed in greater detail below with reference to FIG. 2.

System 100 include public domain 110 and private domains 120 and 130. Public domain 110 may represent a collection of public servers and devices linked to network 102. In some embodiments, these servers are cloud servers. Public domain 110 also may be known as a public network of the public servers. Public domain 110 is accessible by printing device 104. Additional printing devices may connect to public domain 110, such shown by printing device 105. The printing devices may be located in public places, such as convenience stores, libraries, printing and copying stores and kiosks, and the like. Users may access the printing devices and, in turn, the servers within public domain 110. The users may need to validate their ability to access public domain 110 through a connected printing device.

Public domain 110 includes public policy server 112. Public policy server 112 interacts with private domains 120 and 130 as well as printing devices 104 and 105. Public policy server 112 may act as the middle man between public domain 110 and the private domains. Public policy server 112 may generate and store tokens used to implement the policy-based operations disclosed below. It also may store and allow access to a policy 142 received from a private domain, upon request. Policy 142, disclosed in greater detail below, outlines what a user can and cannot do when printing to printing device 104 from a private domain.

Public file server 114 is connected to public policy server 112. Public file server 114 may store or host binary data 140 for print job from a private domain. Printing device 104 may retrieve binary data 140 securely for a print job. In some embodiments, printing device 104 does so through public policy server 112. Public file server 114 also may receive binary data 140 from a server in a private domain, as disclosed below.

System 100 includes private domains 120 and 140. System 100 may include additional private domains, not shown here. Each private domain may include a plurality of private servers that are protected by a firewall from access from network 102. For example, private domain 120 includes firewall 122. Firewall 122 may be a software or hardware device that filters data and information coming over network 102 to private domain 120 for malicious or unauthorized access. If an incoming packet of data is flagged by the filters in firewall 122, then it is not allowed through to private domain 120. Firewall 132 may serve the same function for private domain 130.

Private domain 120 includes private authentication server 124, private job server 126, and private policy server 128. Private domain 130 includes private authentication server 134, private job server 126, and private policy server 128. The servers for private domain 120 are disclosed below, but their functionality may apply to the servers in private domain 130. Further, additional servers may be in a private domain and used securely to exchange information over network 102.

Private authentication server 124 is a private domain server that will provide authentication and authorize a user to prove his/her identify. Private authentication server 124 may be the main server that connects the private and public domain information exchange. In some embodiments, private authentication server 124 establishes a protocol connection 144 with public policy server 112 to provide a domain list 146 for access to private domain 120. Private authentication server 124 also verifies a user trying to access private domain 120 using public policy server 112.

Private job server 126 is a private domain server that stores all the binary data for the job files, or print jobs. When a user wants to print out a job file at printing device 104, private job server 126 should be queried in order to retrieve binary data 140 to generate the print job. Private job server 126 may forward binary data 140 to public file server 114 according to policy 142.

Private policy server 128 is a private domain server that hosts or stores all the policies, such as policy 142, related to a user. When printing device 104 attempts to perform any function, it should request private policy server 128 determine whether the user is allowed to do so. Private policy 128 may do the determination via public policy server 112.

The disclosed embodiments allow access to private servers from a public domain or to print on printing device 104 within a public network. An intranet application may do the authentication and job spooling so users need to authenticate printing device 104 before use. A policy may be associated with where a user can print, what kind of paper, number of pages, and the like. For example, some users may want to print from a public location, such as a convenience store, and want to access a private server that stores the print jobs. They would need access from network 102.

In some embodiments, public policy server 112 is a cloud server. Public policy server 112 may not be able to do accounting policy management to determine whether a user is allowed to print at printing device 104. Private domains 120 and 130 can operate over the cloud. Public policy server 112 may enforce the rules of the policy but management of the policy is still at a private server. Public policy server 112 also needs to distinguish between the private servers and private domains. Thus, if a user is outside the private network for a private domain, public policy server 112 will find the correct private domain to connect. That private domain will validate the user and access or use of the print job.

Figure 2:
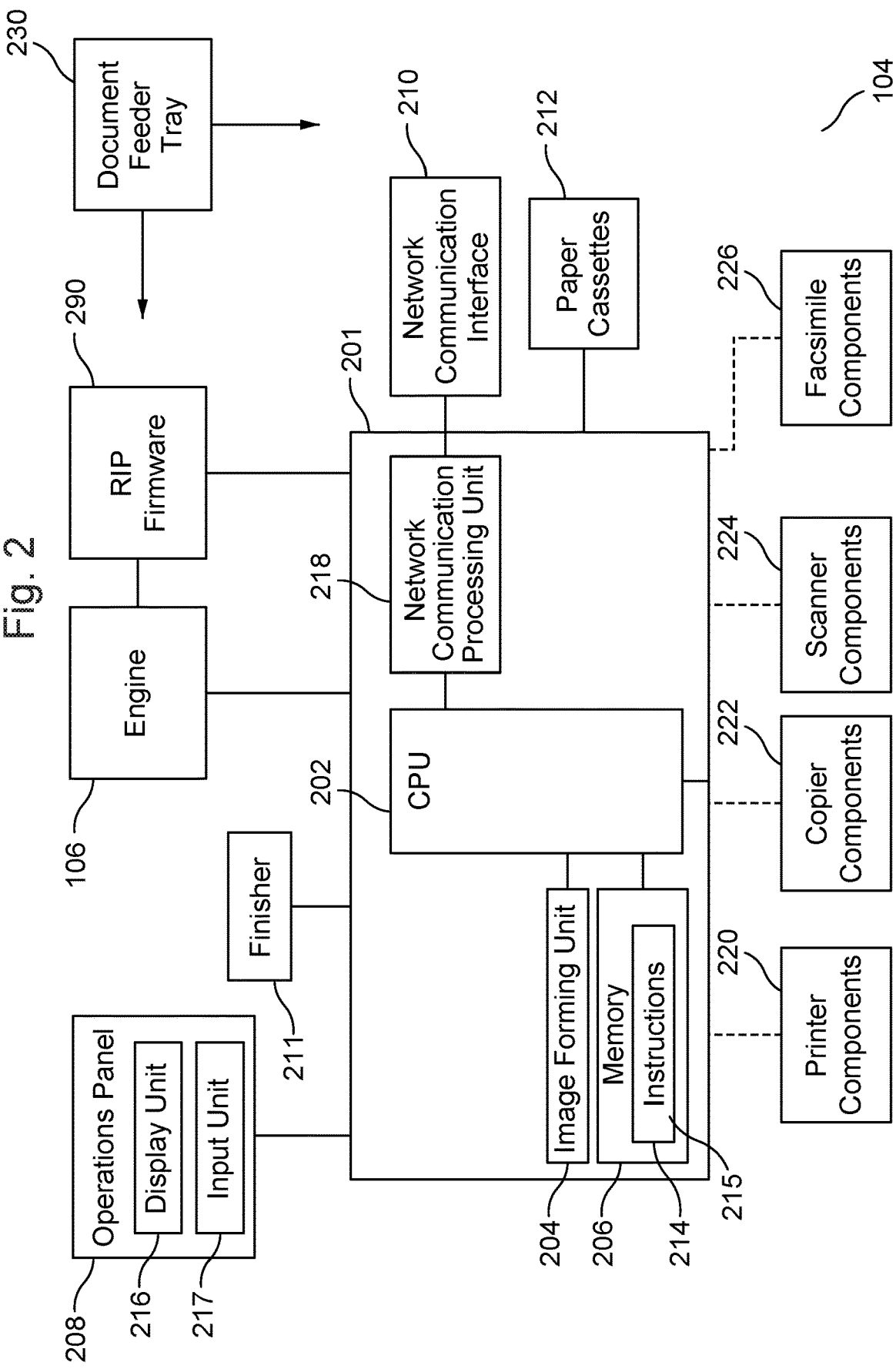
FIG. 2 illustrates a block diagram of components of the printing device used in conjunction with the authentication system according to the disclosed embodiments.

FIG. 2 illustrates a block diagram of components of printing device 104 used in conjunction with system 100 according to the disclosed embodiments. The architecture shown in FIG. 2 may apply to any multi-functional printer or image forming apparatus that scans documents to perform other functions, such as printing, storing, copying, and the like. As disclosed above, printing device 104 may send and receive data from public domain 110 and private domains 120 and 130.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to image the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine firmware 106 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the authentication operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter an identification code 138 generated by mobile application 110 into printing device 104.

Printing device 104 also includes network communication processing unit 218. Network communication processing unit 218 may establish a network communication, such as a wireless or wired connection with one or more other image forming apparatuses and a server in an image forming system. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 106. Engine 106 may be a combination of hardware, firmware, or software components that act accordingly to accomplish a task. For example, engine 106 is comprised of the components and software to print a document. It may receive instructions from computing platform 201 after user input via operations panel 208. Alternatively, engine 106 may receive instructions from other attached or linked devices.

Engine 106 manages and operates the low-level mechanism of the printing device engine, such as hardware components that actuate placement of toner onto paper. Engine 106 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 106 for actual rendering of an image and application of the toner onto paper during operations on printing device 104.

Figure 3:
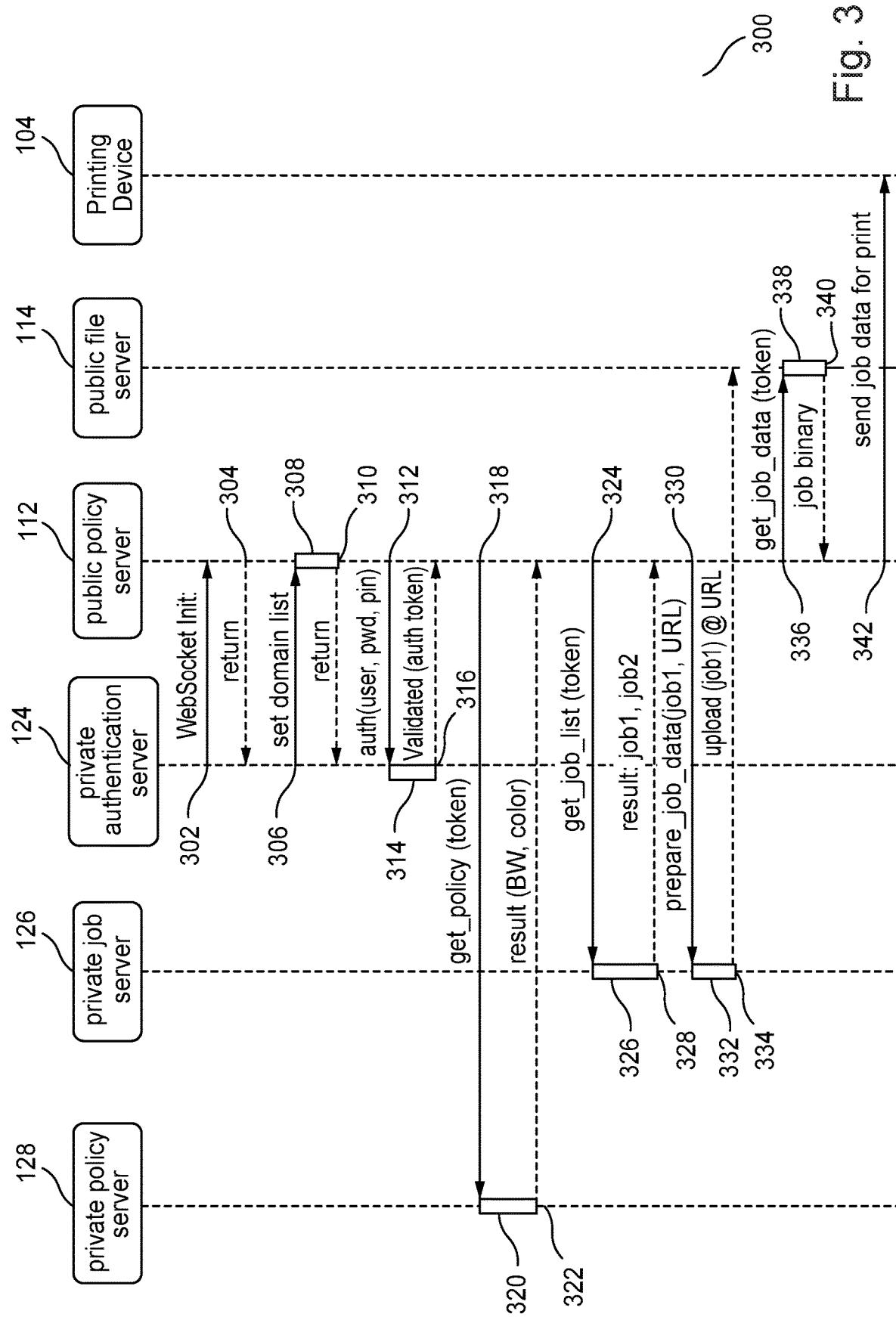
FIG. 3 illustrates a flow diagram for implementing a policy-based printing system according to the disclosed embodiments.

FIG. 3 depicts a flow diagram 300 for implementing policy-based printing system 100 according to the disclosed embodiments. In disclosing the embodiments shown by flow diagram 300, reference may be made to elements shown in FIGS. 1-2 and 4A, 4B, and 5. Flow diagram 300 shows the operations between the various servers disclosed in FIG. 1 above. Flow diagram 300 also depicts the actions taken at the various servers. The private and public servers may perform additional operations and actions not shown herein. The operations may be executed over network 102. Further, flow diagram 300 shows the operations between public domain 110 and private domain 120. Thus, firewall 122 may exist between the public servers and the private servers. The same operations may be executed between public domain 110 and private domain 130.

The processes disclosed by flow diagram 300 seek to solve the problem of how to authenticate a user in one location, such as a convenience store with printing services, that he/she is within an organization that has a policy applicable to the user. Further, the policy is stored in a private domain not readily accessible from the printing device at the convenience store. The printing device is connected to a public network and may be part of a public domain, such as public domain 110. The disclosed embodiments enable the user and the organization to implement the policy, which is applicable to the private domain, within the public domain of the printing device located in the convenience store.

Operation 302 executes by private authentication server 124 sending an initialization request to public policy server 112. As disclosed above, private authentication server 124 is within private domain 120 and public policy server 112 is within public domain 110. To send the initialization request, an administrator enter information about public policy server 112. Such information may include server network address, location, server capabilities, and the like. Once the information is entered, private authentication server 124 generates a verification token 502 which verifies that public policy server 112 is acceptable to receive information and communicate with the private authentication server.

Operation 304 executes by returning acceptance of the initialization request and establishing a protocol connection 144 between private authentication server 124 and public policy server 112. Protocol connection 144 may stay established as long as public policy server has verification token 502. Verification token 502 may be stored on public policy server 112 and presented whenever verification is required by private authentication server 124. Protocol connection 144 provides a persistent connection between private authentication server 124 and public policy server 112 that allows the servers to send data at any time. Protocol connection 144 preferably may be known as a WebSocket connection, which provides a full-duplex communication channel over a single connection. Preferably, protocol connection 144 uses a secure protocol.

Operation 306 executes by providing a domain list 400 from private authentication server 124 to public policy server 112. This operation also may include providing the information about the private authentication server. Action 308 executes by setting domain list 400 at public policy server 112 to include domain information for private authentication server 124. Public policy server 112 may refer to domain list 400 whenever a user attempts to print from a private domain. Public policy server 112 may use information provided by the user to determine which domain to obtain policy 142. For example, public policy server 112 may be connected to more than one private domain. Domain list 400 determines which private domain applies to a user trying to print.

FIG. 4A depicts an example domain list according to the disclosed embodiments. Domain list 400 may be a file having fields for the private domains and the email domains associated with each domain. A user is identified as part of a domain using his/her email address. Public policy server 112 will compare the email provided by the user to determine which private domain to access. As shown in FIG. 4A, private domain 120 may be associated with two email domains 402 and 404. A user having an email domain with "@example1.com" or "@example2.com" will have its policy and associated documents located on private domain 120. A user having an email domain 406 with "@company.com" will have its policy and associated documents located on private domain 130. Additional private domains may be served by public policy server 112. Private domain N will receive requests for policies of users having email domain 408 of "@firm.com" and private domain N+1 will receive requests for policies of users having email domain 410 of "@college.com."

As can be seen, companies, firms, and colleges have an interest in keeping their network domains private. Further, these entities may wish to limit use of printing devices within public domains according to a policy. Domain list 400 also may include an entry for a public domain, such as public domain X. In some instances, a public domain also may include policies to limit capabilities of a user on a printing device 104. These policies, however, may not be within a private domain and available for retrieving through a public network connection. An email domain of "@website.com" may direct public policy server 112 to a public domain for the associated policy 142. Referring back to FIG. 3, operation 310 returns an acknowledgement to private authentication server 124 that domain list 400 has been set and protocol connection 144 exists with public policy server 112.

Operation 312 executes when a user wants to print a document at printing device 104 coupled to public policy server 112. Authentication information 504 is provided from public policy server 112 to private authentication server 124. In some embodiments, the user enters a username and password that is captured by public policy server 112. For example, the user may enter this information at printing device 104 which forwards it to public policy server 112. Alternatively, the user may connect to public policy server 112 through an application on a mobile device or the like to provide authentication information 504.

In other embodiments, the user may enter a code, such as a personal identification number (PIN), that retrieves this information to provide it to public policy server 112. Public policy server 112 receives the code and matches the user information when the code is provided. Other embodiments may use a graphical code or identification card having a number that provides this information. Operation 312 sends this authentication information 504, such as username, password and PIN, to private authentication server 124.

Action 314 executes by authenticating the user with authentication information 504. Thus, user information is not stored on public policy server 112. Authentication still occurs in private domain 120 behind firewall 122. If the user is authenticated, then action 314 also includes private authentication server 124 generating authentication token 506. Operation 316 executes by indicating that the user has been validated and providing authentication token 506 to public policy server 112. Public policy server 112 may assign authentication token 506 to the user. Using the PIN example, the entered PIN may be associated with authentication token 506.

Private authentication server 124 also may provide an email address or the email domain, such as email domains 402-412 shown in FIG. 4A, to public policy server 112 if this information is not already available. For example, it may be too cumbersome to enter email addresses at printing device 104. Further, the administrators of private domain 120 may not want valid email addresses being entered at printing device 104 on a public network or in a public place. Thus, no email address is provided to public policy server 112 from within public domain 110 but, instead, from private domain 120. Moreover, private authentication server 124 may provide only the domain and not the actual email address.

Once validated, public policy server 112 now retrieves a policy 142 from private policy server 128. Operation 318 executes by getting policy 142. The email domain is compared against domain list 400 to determine which private domain to query for the policy. In this example, user@example1.com is the email provided to public policy server 112. It compares the email to domain list 400 to determine the applicable policy is within private domain 120. Public policy server 112 sends determined domain 508, such as example1.com, along with authentication token 506 to private policy server 128 in operation 318. If the next user has an email domain of @company.com, then public policy server 112 determines that domain 508 is company.com and that the applicable policy is located in private domain 130.

Figure 4B:
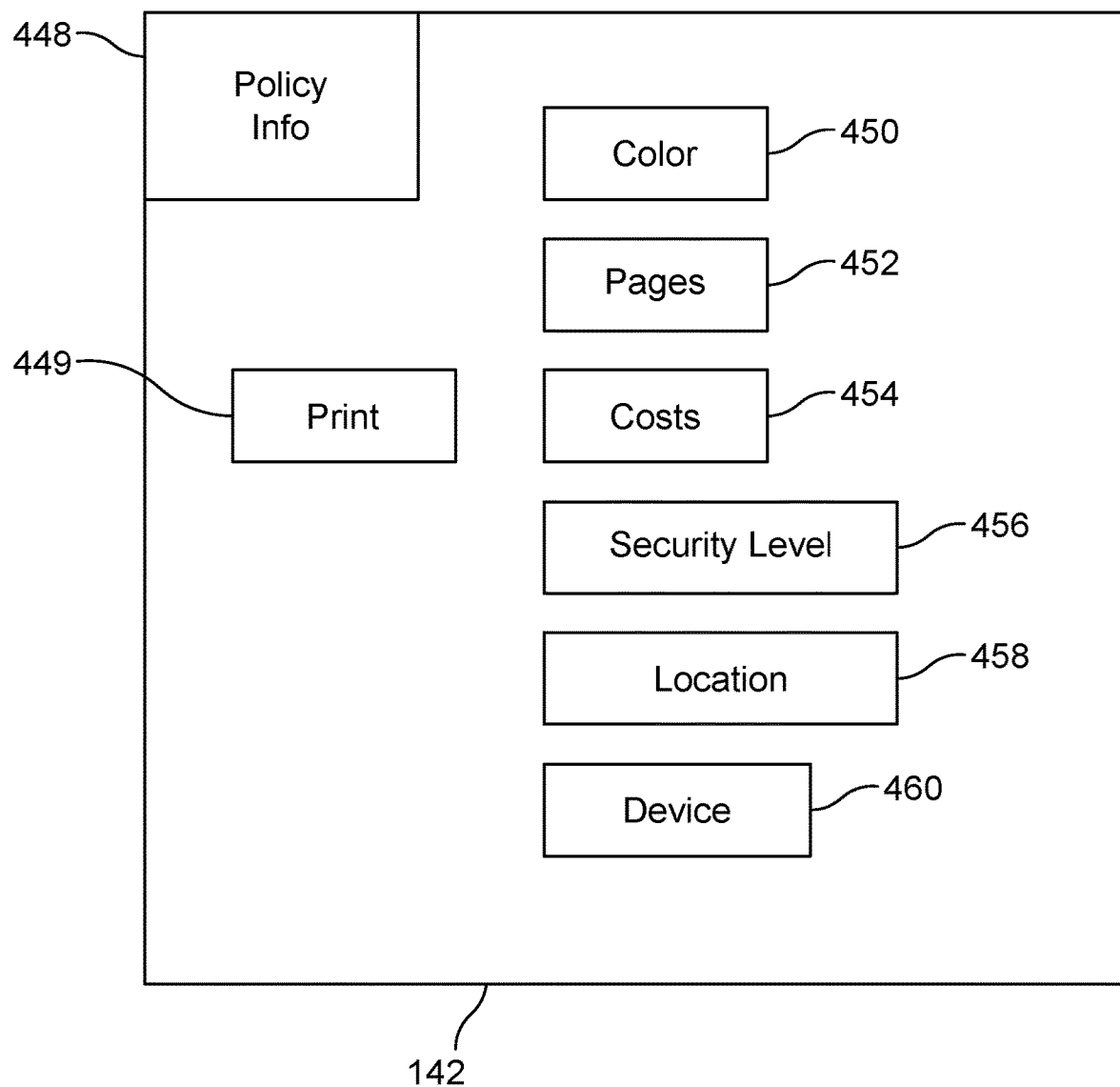
FIG. 4B illustrates a policy for use within the policy-based printing system according to the disclosed embodiments.
Figure 5:
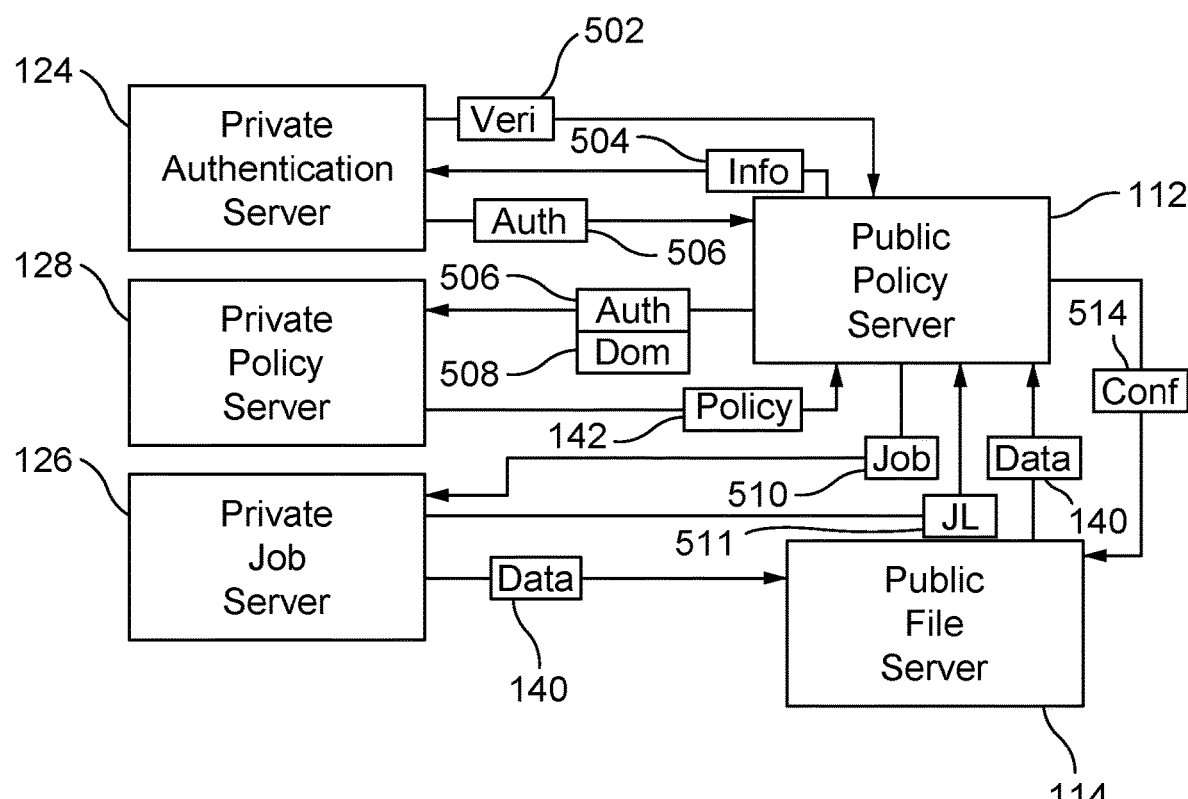
FIG. 5 illustrates a block diagram of servers and data used within the policy-based printing system according to the disclosed embodiments.

Action 320 executes by identifying policy 142 as being applicable to the user based on domain 508. Authentication token 506 may be associated with the user and this information provided from private authentication server 124. Policy 142 may be a file having flags or other information to indicate what the user can do within a public network. For example, limitations may be set as to what type of printing can be done, the number of pages may be printed, and the like. FIG. 4B depicts a block diagram of an example policy for policy 142 according to the disclosed embodiments.

Policy 142 may include policy information 448. Policy information 448 may include a title of the policy, document information, and private domain information. Policy 142 includes data, such as flags, that indicates what can and cannot be performed in public domain 110. This data may be known as parameters in policy 142. Examples of parameters that limit printing operations are shown in FIG. 4B. Print parameter 449 may be set to indicate whether a user can even print outside private domain 120. Certain users may not be allowed to print in a public domain. Print parameter 449 may be set to limit these users to scanning documents only or other operations that do not allow access to any documents or information stored in private domain 120.

Color parameter 450 may indicate whether the user can do color printing in public domain 110. If no, then the user may be limited to only black and write printing. The user may be allowed to do color printing at printing devices in private domain 120 but not allowed to do so in a public domain setting.

Pages parameter 452 may set a limit on the number of pages that a user can print. The administrators of private domain 120 do not want unlimited printing to occur outside the private domain. Pages parameter 452 may limit the number of pages printed per day, week, month, hour, year, and the like. Alternatively, pages parameter 452 may cap the number of pages printed to have the user check with the administrators of public domain 120 to reset this parameter. Once the user hits a limit, he/she requests that the number of pages printed be reset to allow further operations. Costs parameter 454 may be similar to pages parameter 452 except to limit the amount of fees that the user may incur before printing is stopped. Costs parameter 454 helps prevent the user from running up large bills at a convenience store. It also may cap the amount of costs incurred on a periodic basis or as a total cost.

Security level parameter 456 may indicate that the user can only access documents from a job list provided from private job server 126 having a certain security or access level. Security level parameter 456 may help prevent accidental or intentional printing of sensitive documents at printing device 104. Further, the user may have access to sensitive documents when printing within private domain 120 but not so when printing using public domain 110. Policy 142 may limit exposure to such documents.

Location parameter 458 may indicate whether the user can print at certain locations. Policy 142 may place geographic or other limitations on where the user can print using a public domain. Location parameter 458 also may indicate the type of locations to allow printing operations. For example, the administrators of private domain 120 may not allow printing in a convenience store but may allow printing in a library. Device parameter 460 may act similar to location parameter 458 except limit printing on certain devices. For example, policy 142 may not allow printing on a printing device 104 that does not have legal sized paper capability or stores the data from the job file in a memory on the device. Device parameter 460 also may limit printing operations to known printing devices having a serial number or IP address.

Operation 322 executes by providing policy 142 to public policy server 112. Public policy server 112 may configure policy 142 to determine whether the user can print using public domain 110 and what limits on the printing operations may be enforced. Policy 142 may apply to all users of private domain 120. Alternatively, policy 142 may treat users differently. Some users may have unlimited printing privileges according to parameters 452 or 454 while others are prevented from exceeding a cap set forth by these parameters. Public policy server 112 configures the determinations using policy 142 accordingly.

Using the parameters within policy 142, operation 324 executes by getting a job list from private job server 126. Public policy server 112 may generate a job token 510. Job token 510 is presented to private job server 126 to obtain a job list 511 of print jobs available to the user. In some embodiments, job token 510 may include data that specifies what print jobs can be added to job list 511 based on the parameters set forth in policy 146. Job list 511 includes those print jobs that meet the specifications of policy 146. For example, color print jobs will not be included in job list 511 of policy 146 does not allow color printing for the user in a public domain. Action 326 executes by generating job list 511 in response to job token 510. Operation 322 executes by sending the print jobs in job list 511 to public policy server 112 from private job server 126.

The user then may select a print job from job list 511. The user may select from an interface provided on printing device 104 that is then communicated to public policy server 112. Alternatively, an application may execute on a device of the user that presents the job list and allows for selection from the list. The selection is sent to public policy server 112. Operation 330 executes by sending a command to private job server 126 to prepare a selected print job along with a uniform resource locator (URL) address from public policy server 112. The URL address is one associate with public policy server 112 and accessible from public domain 110.

Action 332 executes by retrieving and preparing the data for the print job. Preferably, the data is binary data that represents the document for the print job. This may be shown as binary data 140 in FIGS. 1 and 5. Action 332 also may convert the data into a format compatible with printing device 104. For example, the document may include data that calls for printing on a legal sized paper while printing device 104 only prints using letter sized paper. The data sent from private job server 126 may be modified to fit onto a letter sized paper.

Operation 334 executes by uploading binary data 140 to the URL address provided in operation 330. Thus, private job server 126 puts the data for the print job outside private domain 120 for the first time at this point. The URL address may be valid for only a specified period of time, such as two hours, one day, a week, and the like. After that point, the URL address may expire. The URL address to download binary data 140 for the print job is provided to public file server 114.

Public policy server 112 now retrieves binary data 140 and sends the data to printing device 104. Before that occurs, however, the disclosed embodiments may confirm whether the user has enough funds to pay for processing and completing the print job. Operation 336 executes by generating a confirmation token 514 at public policy server 112 once it is confirmed that the user or user's account has enough money to cover expenses to print. Public policy server 112 may compare the funds available to the cost to complete the print job. If there are enough funds, then confirmation token 514 is generated and sent to public file server 114. If not, then the user may be alerted to add more funds to his/her account.

Action 338 executes by obtaining uploaded binary data 140 from the URL address. Public file server 114 may send a call to the URL address which then sends binary data 140 to the public file server. Public file server 114 may store binary data 140 until confirmation token 514 is received. If a confirmation token 514 is not received within a specified time frame, then binary data 140 may be deleted from public file server 114. This feature prevents print jobs from private domain 120 from being stored indefinitely in public domain 110. Other factors may be used to determine when to delete any stored files of binary data.

Operation 340 executes by sending binary data 140 for the print job from public file server 114 to public policy server 112. Operation 342 executes by sending binary data 140 from public policy server 112 to printing device 104. Printing device 104 may process the print job accordingly. The user's account for printing on public domain 110 may be charged accordingly as well. In some embodiments, public file server 114 may send binary data 140 to printing device 104.

The disclosed embodiments allow a private domain, or network, to print to a public domain using a policy applicable to the public domain. Internal policies to the private domain are not material to printing in the public domain. Further, job data is kept private as long as possible. The data for the print job is provided to the public domain when requested by the user and approved according to the policy. This feature allows the user to print anywhere. The print job is not automatically sent outside the private domain or from the private servers until printing actually occurs. The disclosed embodiments provide greater flexibility for companies and users to access documents in a secure, private location and use devices and resources in a public setting.

Figure 6:
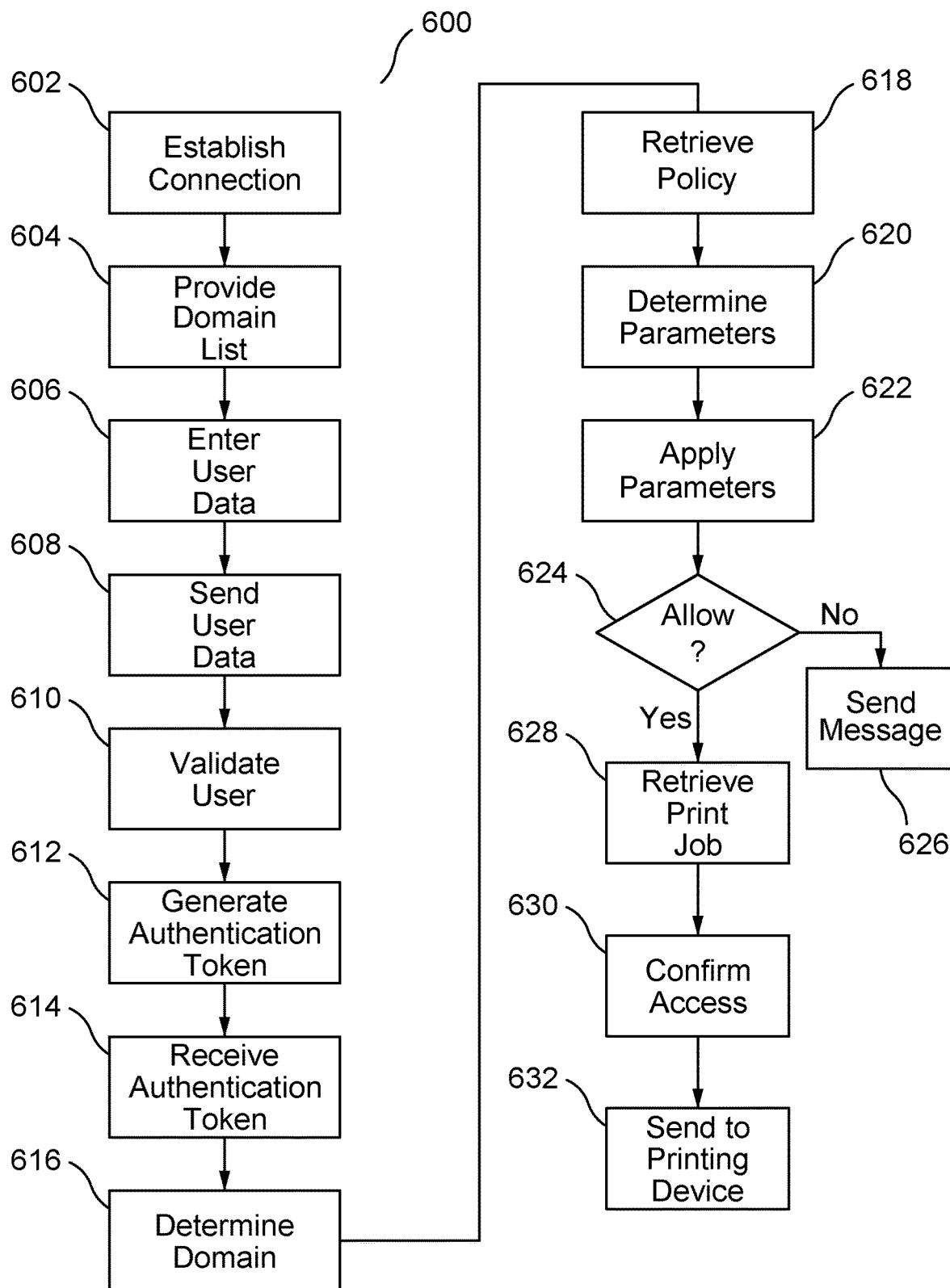
FIG. 6 illustrates a flowchart for printing at a printing device within the policy-based printing system according to the disclosed embodiments.

FIG. 6 illustrates a flowchart 600 for printing at printing device 104 within policy-based printing system 100 according to the disclosed embodiments. Flowchart 600 may refer back to elements disclosed in FIGS. 1-5 for illustrative purposes. The embodiments disclosed by flowchart 600, however, are not limited to the features disclosed in FIGS. 1-5. Further, flowchart 600 may compliment the embodiments disclosed by flow diagram 300.

Step 602 executes by establishing a protocol connection 144 between private authentication server 124 and public policy server 112. The protocol connection allows communication between the servers, one in private domain 120 and another one in public domain 110. Step 604 executes by providing a domain list 146 from private authentication server 124 to public policy server 112. Domain list 146 may include applicable private domains and associated email domains that are accessible by public policy server 112. Step 606 executes by entering user data 504 within public network 110 and providing the data to public policy server 112. Step 608 executes by sending user data 504 to private authentication server 124.

Step 610 executes by validating the user at private authentication server 124. Private authentication server 124 checks the provided user data 504 against its stored authentication records for the user. If the user is validated, then step 612 executes by generating authentication token 506. Step 614 executes by receiving authentication token 506 at public policy server 112. Step 616 executes by determining the applicable private domain for the user according to domain list 146. Preferably, public policy server 112 uses the email address for the user to determine which private domain to access for the policy for the user.

Step 618 executes by retrieving policy 142 from private policy server 128 based on the receipt of authentication token 506 and domain 508 from public policy server 112. Private policy server 128 is identified according to the applicable domain 508 and queried by public policy server 112. Once verified, private policy server 128 sends policy 142 to public policy server 112.

Step 620 executes by determining the parameters for policy 142. This process is disclosed above. As shown in FIG. 4B, policy 142 may include parameters that outline what printing options are available to the user. Step 622 executes by applying the parameters to configure public policy server 112 to determine what print jobs or operations are available to the user in public domain 110.

Step 624 executes by determining whether the user is allowed to access printing device 104 using public domain 110 according to the policy. Further, step 624 determines what print jobs are available to the user according to policy 142. The determination also may include reviewing policy 142 for allowing other operations on printing device 104 such as scanning, editing, faxing, and the like. If no, then step 626 executes by sending a message to the user or public policy server 112 that the operation on printing device 104 is not allowed.

If step 624 is yes, then step 628 executes by retrieving the print job from private job server 126. A job list 511 may be provided. The print job is selected from job list 511. Job token 510 is generated by public policy server 112. Public policy server 112 sends job token 510 to private job server 126 to obtain job list 511. Upon selection of the print job, private job server 126 uploads binary data 140 for the print job to a location accessible by public file server 114. Step 630 executes by confirming access to binary data 140 for the print job by checking to see if the user has enough money to pay for using printing device 104. Other restrictions also may be checked, such as time of day, location, and the like, to confirm whether the print job should be released to printing device 104.

Step 632 executes by sending binary data 140 to printing device 104 upon confirmation in step 630. Public policy server 112 generates a confirmation token 514 to confirm that the user is allowed to print. Public policy server 112 may send confirmation token 514 to public file server 114. Upon receipt of the confirmation token, public file server 114 may forward binary data 140 for the print job to public policy server 112, which provides the data file to printing device 104.

Figure 7:
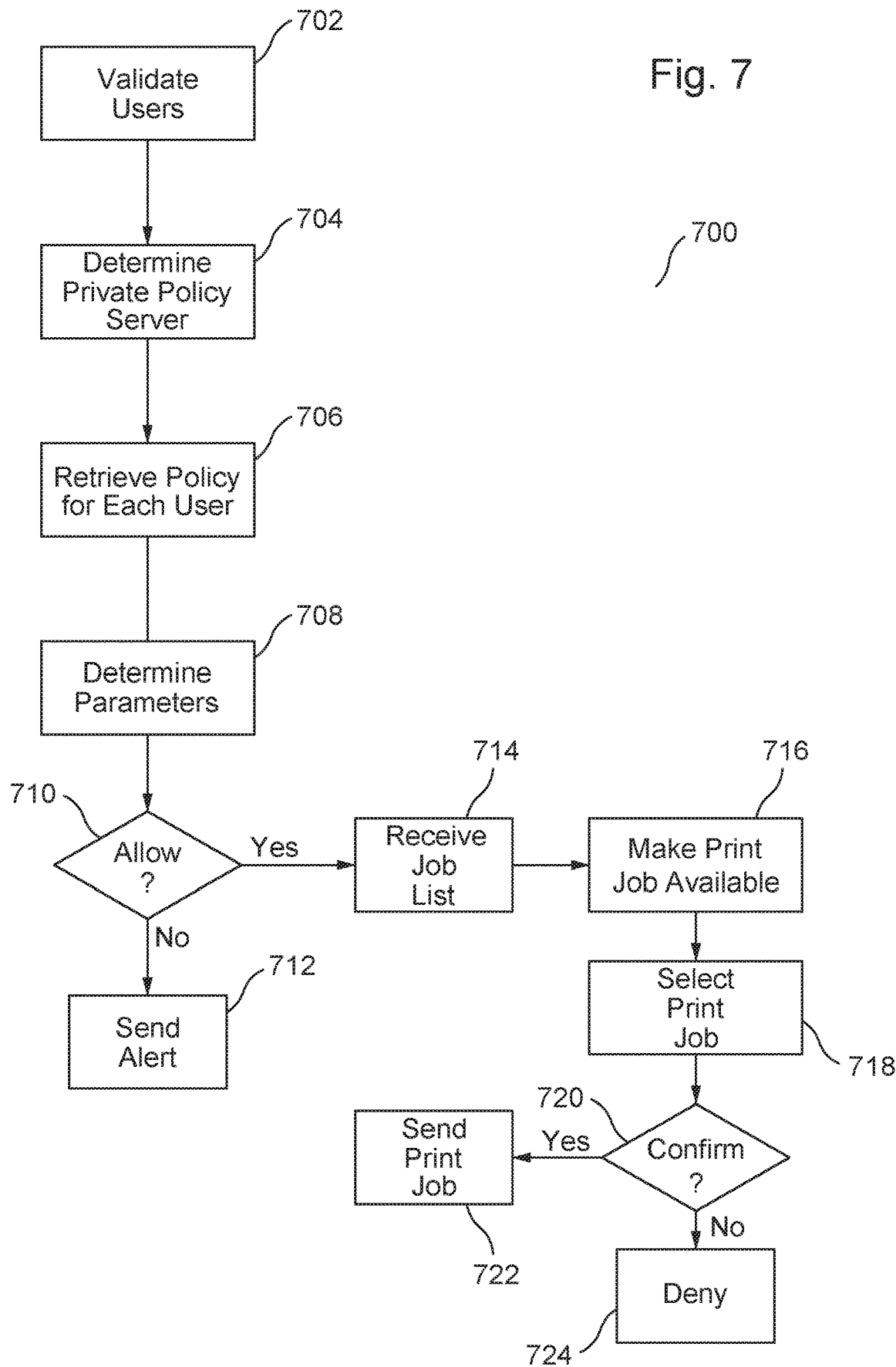
FIG. 7 illustrates a flowchart for implementing a policy-based printing system in a public domain according to the disclosed embodiments.

FIG. 7 illustrates a flowchart 700 for implementing a policy-based printing system 100 in a public domain 110 according to the disclosed embodiments. Flowchart 700 may refer back to elements disclosed in FIGS. 1-5 for illustrative purposes. The embodiments disclosed by flowchart 700, however, are not limited to the features disclosed in FIGS. 1-5. Further, flowchart 700 may compliment the embodiments disclosed by flow diagram 300.

As disclosed above, public policy server 112 may interact with a plurality of private domains. Public policy server 112 may retrieve and implement more than one policy for printing or processing print jobs in public domain 110. In some embodiments, public policy server 112 may implement policies for a plurality of public domains as well. Further, a plurality of printing devices may be connected to public policy server 112. Flowchart 700 discloses some embodiments that have public policy server 112 interacting with more than one private domain.

Step 702 executes by validating users within public domain 110 at private authentication server 124. As disclosed above, a protocol connection may be established between public policy server 112 and private authentication server 124 to exchange user information to perform the validation.

Step 704 executes by determining a private policy server for each user according to a domain for the user at public policy server 112. The domains for each user are private domains. Preferably, the email domain for each user indicates the applicable private domain for that user. With two or more users, different email domains may indicate more than one private domain. Step 706 executes by retrieving a policy 142 for each user according to the respective domain from private policy server 128.

Step 708 executes by determining the parameters for each policy 142. All of the policies are received at public policy server 112. Public policy server 112 configures the treatment of printing requests for each private domain according to the corresponding policy. The policy sets forth the parameters for printing from the private domain via the public domain. For example, the parameters for one policy may only allow 100 pages to be printed per user a month from private domain 120 while the parameters for another policy may only allow 20 pages to be printed per user from private domain 130. Public policy server 112 is configured accordingly.

Step 710 executes by determining whether the user is allowed to print according to the applicable policy. If no, then step 712 executes by sending an alert to public policy server 112 or to the user. No printing operations using public domain 110 are allowed. If yes, then step 714 executes by receiving a job list according to the applicable policy from private job server 126. Step 716 executes by making the print jobs in the job list available to the user. Step 718 executes by selecting a print job from the job list. Binary data 140 for the selected print job is retrieved from private job server 126 and made available to public file server 114.

Step 720 executes by confirming whether the print job may be sent to printing device 104. Public policy server 112 confirms that the user has enough funds or credits to perform the request task on printing device 104. If yes, then step 722 executes by sending the print job as binary data 140 to printing device 104. If no, then step 724 executes by denying the print job. The user may be prompted to provide additional funds or credits to perform the requested task.

Figure 8:
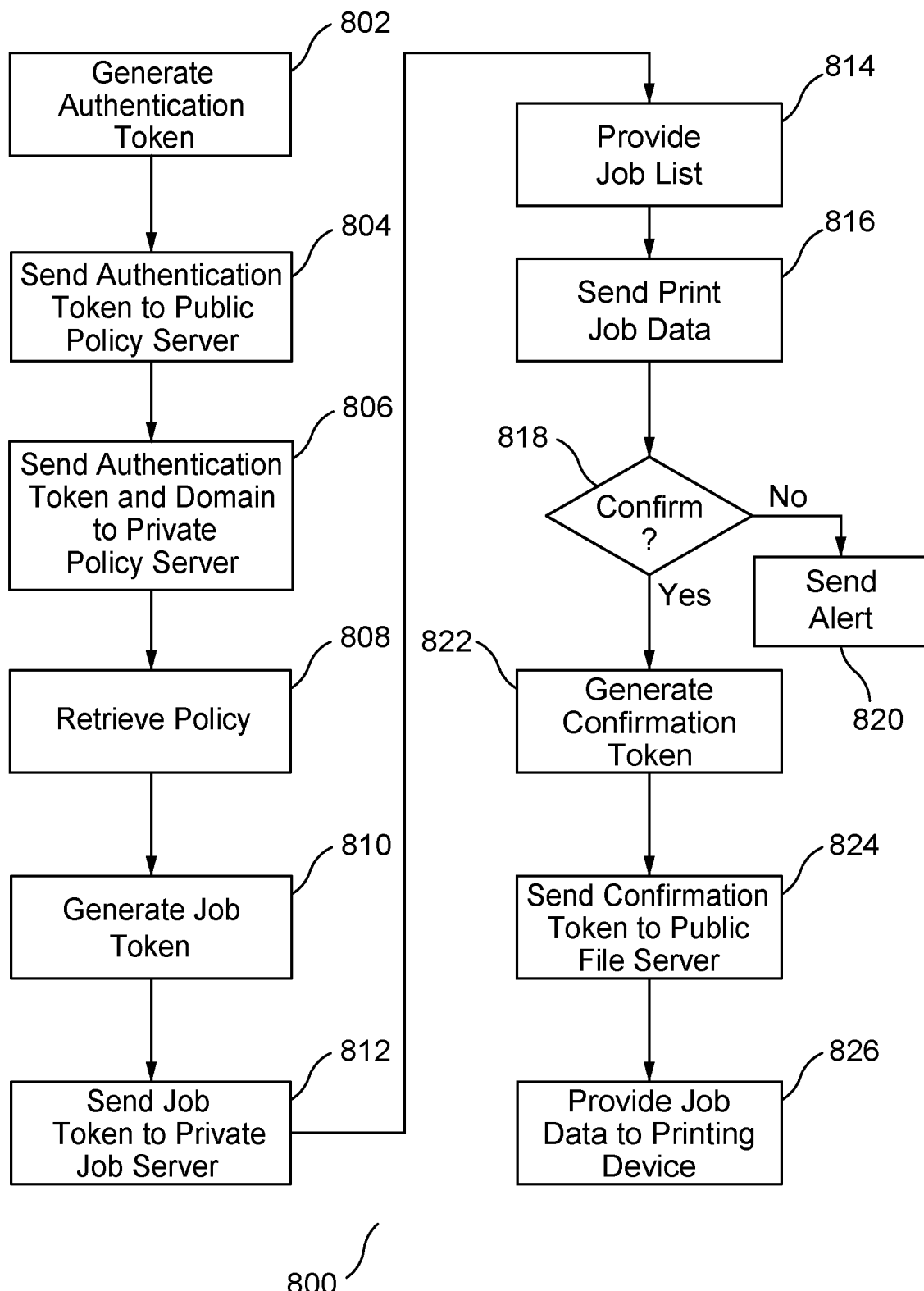
FIG. 8 illustrates a flowchart for implementing a policy-based printing system using tokens according to the disclosed embodiments.

FIG. 8 depicts a flowchart 800 for implementing a policy-based printing system 100 using tokens according to the disclosed embodiments. Flowchart 800 may refer back to elements disclosed in FIGS. 1-5 for illustrative purposes. The embodiments disclosed by flowchart 800, however, are not limited to the features disclosed in FIGS. 1-5. Further, flowchart 800 may compliment the embodiments disclosed by flow diagram 300.

Step 802 executes by generating authentication token 506 at private authentication server 124. This step occurs once private authentication server 124 validates a user attempting to print using public domain 110. Public policy server 112 sends user information 504 including an email address, username, password, or PIN to private authentication server 124. Private authentication server 124, being in private domain 120, may securely store this information for the user. The secure user information is not made available in public domain 110. Authentication token 506 indicates that the user may access private domain 120. Step 804 executes by sending authentication token 506 to public policy server 112.

Step 806 executes by sending authentication token 506 and domain 508 to private policy server 128. Public policy server 112 sends authentication token 506 and domain 508 after the domain is determined using domain list 146. An email address may indicate an email domain that is used as domain 508. Domain 508 indicates which private domain to access for the applicable policy. For example, referring to FIG. 4A, an email of user@example1.com will indicate private domain 120. Public policy server 112 attaches authentication token 506 to domain 508 and sends the request for the policy for the user.

Step 808 executes by retrieving policy 142 from private policy server 128. Authentication token 506 confirms that the user corresponds to the policy. Authentication token 506 may include data provided by private authentication server 124 that identifies the user as able to use private domain 120 and, therefore, policy 142 for the private domain should be used in printing on public domain 110. Private policy server 128 sends policy 142 to public policy server 112. Public policy server 112 then configures itself to apply the parameters of the policy to using public domain for the user.

Step 810 executes by generating job token 510 at public policy server 112 after applying the parameters of policy 142. The parameters may detail what the user can do using public domain 110. These parameters may not necessarily correspond to what the user can do using private domain 120. Limitations are placed on the user on how he/she can use printing device 104. Job token 510 may reflect the parameters to compile the job list of print jobs available to the user according to policy 142.

Step 812 executes by sending job token 510 to private job server 126. Private job server 126 may store the print jobs available to the user or to users in private domain 120. In some embodiments, a plurality of print jobs may be available such that a job list 511 is generated based on the parameters for the user in using public domain 110. Job token 510 may be used in generating job list 511 in that it includes information to select the appropriate print jobs to include in the print job list.

Step 814 executes by providing print job list 511 to public policy server 112. The user may select a print job from print job list 511. Alternatively, the desired print job may already be selected such that public policy server 112 receives data for the selection, such as from an application on a mobile device, that corresponds to the print job in job list 511. Public policy server 112 then requests the print job data from private job server 126. Step 816 executes by sending job binary data 140 for the selected print job from private job server 126 to public file server 114.

Step 818 executes by confirming whether the user may print or process the print job at printing device 104. For example, public policy server 112 may confirm that the user has enough funds in an account to pay for printing on printing device 104. If step 818 is no, then step 820 executes by sending an alert to the user or to public policy server 112 that printing operations are to be stopped until the condition is met. Using the above example, the user may be asked to provide additional funds to his/her account to print the document.

If step 818 is yes, then step 822 executes by generating confirmation token 514 by public policy server 112. Confirmation token 514 indicates that the processing of binary data 140 at printing device 104 may proceed. Step 824 executes by sending confirmation token 514 to public file server 114 to obtain binary data 140, which is stored thereon. Public file server 114 may send binary data 140 to public policy server 112 upon receipt of confirmation token 514.

Step 826 executes by providing binary data 140 to printing device 104. Public policy server 112 may send binary data 140 once a connection is established with printing device 104. Public policy server 112 may have to wait until printing device 104 is available before forwarding binary data 140. Thus, the data from private job server 126 is not made available on printing device 104 until the operations are ready to commence. Although the current embodiments discuss printing on printing device 104, other operations also may occur, such as scanning, editing, faxing, and the like.

Figure 9:
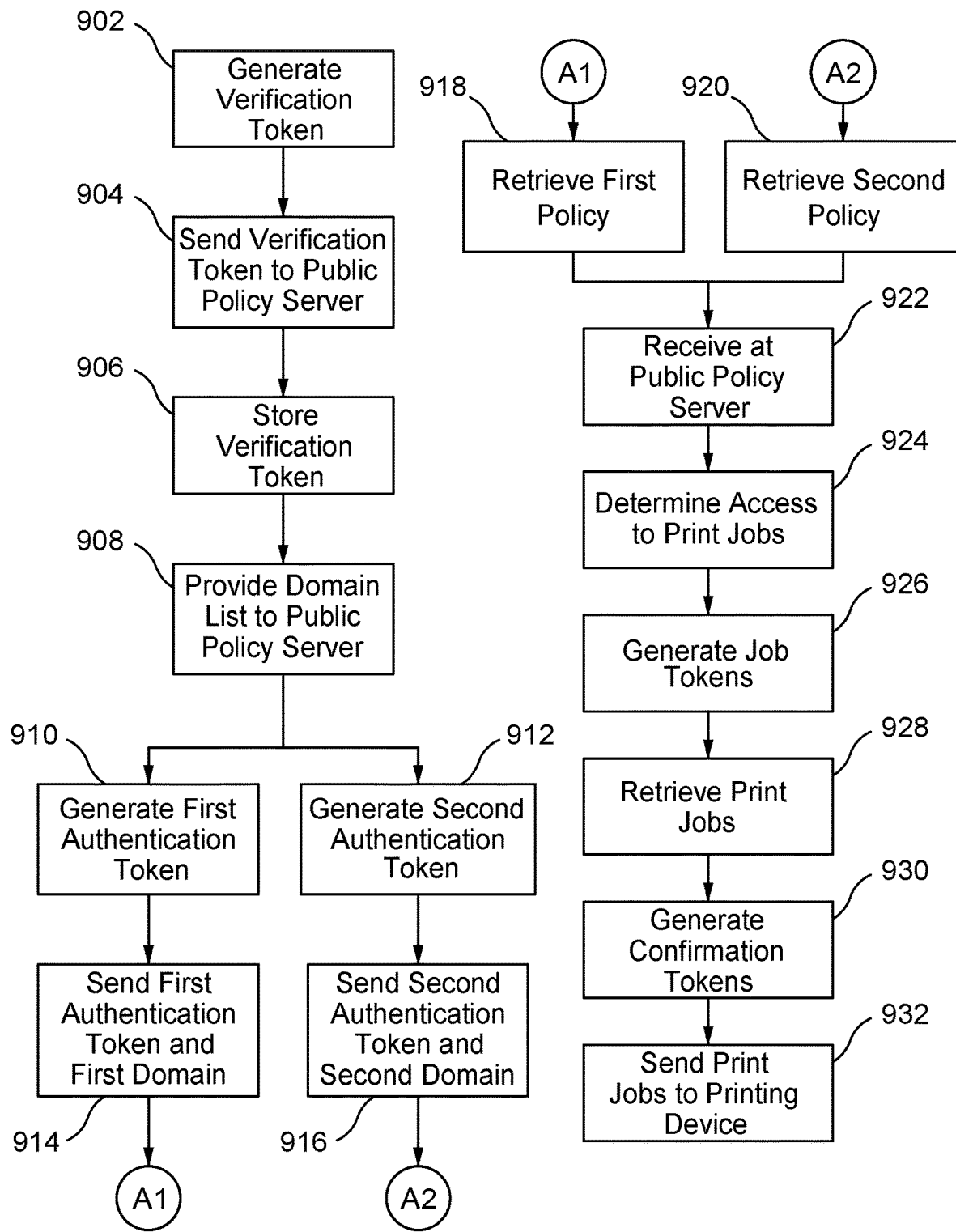
FIG. 9 illustrates a flowchart for selecting a plurality of print jobs from a plurality of private domains for printing in a public domain according to the disclosed embodiments.

FIG. 9 depicts a flowchart 900 for selecting a plurality of print jobs from a plurality of private domains 120 and 130 for printing in public domain 110 according to the disclosed embodiments. Flowchart 900 may refer back to elements disclosed in FIGS. 1-5 for illustrative purposes. The embodiments disclosed by flowchart 900, however, are not limited to the features disclosed in FIGS. 1-5. Further, flowchart 900 may compliment the embodiments disclosed by flow diagram 300.

As disclosed above, different policies apply to different users and prints jobs from different private domains. One private domain may not allow color printing while another private domain may not allow unlimited printing. Thus, public policy server 112 configures itself to resolve the different requirements set forth in a plurality of policies from various private policy servers. Further, public policy server 112 may manage different job lists and print jobs from the plurality of private domains. Alternatively, a private domain may have different domains related to it, such as example1.com and example2.com for private domain 120 shown in FIG. 4A. Different policies may come from a single private policy server.

Step 902 executes by generating verification token 502 at private authentication server 124. Private authentication server 124 receives information about public policy server 112 in order to establish a protocol connection. Verification token 502 helps to establish a connection between private authentication server 124 and public policy server 112. Private authentication server 134 also may generate a verification token 502 to establish protocol connection to public policy server 112.

Step 904 executes by sending verification token 502 to public policy server 112. Step 906 executes by storing verification token 502 at public policy server 112. As long as public policy server 112 can present verification token 502 when requested or when submitting a print request for a user, the connection is established with private authentication server 124. Step 908 executes by providing domain list 146 from private authentication server 124 to public policy server 112. Domain list 146 may include information pertaining to a plurality of domains for a plurality of private domains, as disclosed by FIG. 4A.

Step 910 executes by generating a first authentication token 506. Step 912 executes by generating a second authentication token 506. The first authentication token may be generated in response to a first user providing user information at public policy server 112. The second authentication token may be generated in response to a second user providing user information at public policy server 112. Public policy server 112 may access the appropriate private authentication server to validate the user information for each user. In some embodiments, private authentication server 124 may validate both users and generate both authentication tokens. Alternatively, private authentication server 124 may generate the first authentication token while private authentication server 134 may generate the second authentication token. Public policy server 112 may have instructions when to use the different private authentication servers.

Step 914 executes by sending the first authentication token and a first domain to a first private policy server. Step 916 executes by sending the second authentication token and a second domain to a second policy server. Public policy server 112 determines which private domain is applicable to each user. The determination of the private domain may be based on the email address for each user. In some embodiments, public policy server 112 may send this data to a single private policy server, which stores different policies for different domains that use a single private domain. Alternatively, the authentication tokens and domains may be sent to separate private policy servers. For example, the first authentication token and first domain are sent to a first private policy server, such as private policy server 128. The second authentication token and the second domain are sent to a second private policy server, such as private policy server 138.

Flowchart 900 proceeds to steps A1 and A2 for steps 914 and 916, respectively. Steps A1 and A2 then proceed to steps 918 and 920, respectively. Step 918 executes by retrieving a first policy, such as policy 142, in response to the first authentication token and the first domain. Step 920 executes by retrieving a second policy, such as policy 142, in response to the second authentication token and the second domain. In some embodiments, the first policy is stored on private policy server 128 and the second policy is stored on private policy server 138. Alternatively, both policies may be stored on private policy server 128 or 138. The first policy may apply to the first user and the second policy may apply to the second user.

Step 922 executes by receiving the first and second policies at public policy server 112. Step 924 executes by determining access to a first print job according to the first policy and access to a second print job according to the second policy. Public policy server 112 may configure the parameters of each policy to determine what type of print jobs may be made available to each user. For example, the first print job may not be available to the second user according to the second policy. The determination of access may relate to what print jobs are available to the users over public domain 110.

Step 926 executes by generating first and second job tokens, such as job token 510, based on the first and second policies at public policy server 112. A first job token is generated for the first policy and a second job token for the second policy. In some embodiments, the first job token may be sent to private job server 126 and the second job token may be sent to private job server 136. The different private job servers are in separate private domains. Alternatively, the job tokens may be sent to private job server 126 or 136.

Step 928 executes by retrieving a first job list, such as job list 511, based on the first policy and the received first job token and retrieving the second job list, such as job list 511, based on the second policy and the received second job token. The applicable private job server or servers provide the job lists to public policy server 112. The first user may select a first print job from the first print job list. The second user may select a second print job from the second print job list. These requests are communicated back to the application private job server or servers. The binary data for the first and second print jobs are sent to public file server 114.

Step 930 executes by generating confirmation tokens, such as confirmation token 514, at public policy server 112 to indicate that the print jobs may be processed at printing device 104. Public policy server 112 may confirm that each user has enough funds in his/her account to perform operations on printing device 104, as disclosed above. A first confirmation token for the first print job is presented to public file server 114. A second confirmation token for the second print job is presented to public file server 114. Public file server 114 provides the binary data for each print job to public policy server 112. Step 932 executes by sending the binary data for the first and second print jobs to printing device 104.

Figure 10:
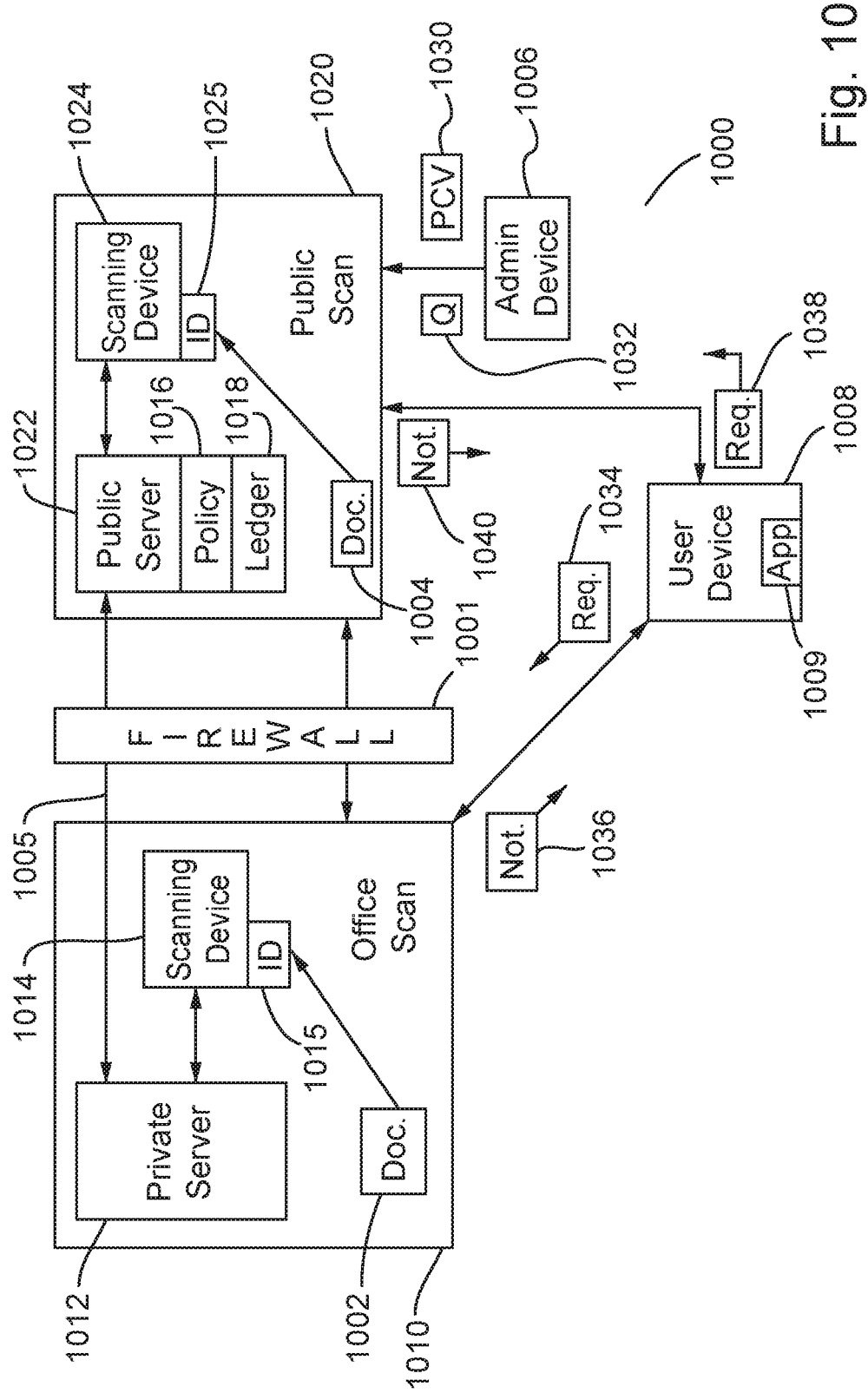
FIG. 10 illustrates a policy-based system to implement policy-based scanning using a public scan service according to the disclosed embodiments.

FIG. 10 depicts a policy-based scanning system 1000 to implement policy-based scanning using a public scan service 1020 according to the disclosed embodiments. System 1000 may differ from system 100 disclosed above in that it includes an office scan service 1010 and a public scan service 1020. Although system 1000 discloses a scanning system, the features disclosed above with regard to FIGS. 1-9 also may apply here. System 1000 may use the processes disclosed above to authenticate a scanning device and scan documents using the scanning device according to a policy. Referring to FIG. 2 disclosed above, printing device 104 includes scanner components 224. Thus, a scanning device also may be a printing device according to some embodiments.

Both scan services may be cloud-based scan services. Scanning operations may be managed in the cloud. Private server 1012 and public server 1022 may be cloud-based servers in that using network connections, users may be able to access these servers as well as the services provided by office scan service 1010 and public scan service 1020. For example, public scan service 1020 may use a network of remote servers and scanning devices on the internet or network 102 to store, manage, and process data for documents. In some embodiments, public scan service 1020 may be a platform-as-a-service cloud scanning service.

Public scan service 1020 may be known as a cloud office that manages costs and scanning or printing limitations. Some systems do so on-site using a server at the customer location. The disclosed embodiments enable such management to occur in the cloud. Public scan service 1020 is a cloud solution that allows printing and scanning cost management by allocating credits for an upper limit in terms of costs and quotas for an upper limit of the number of pages or amount of data allowed for use. Public scan service 1020 also may store any information related to the users, or employees, of the subscribing organization on the cloud. Public scan service 1020 may not need a resource on-site to manage print jobs or administrative personnel to provide such services. Thus, smaller organizations may implement a public scan service for their employees because these items are not required.

Many companies and organizations use office scan services with scan policy and credit features to control the scan volume in the office. Some of these services are cloud-based. An organization wishes to track and limit the amount of scanning done in the office. In some embodiments, the user also can use a cloud-based public scan service outside the office. The public scan service does not integrate with the cloud-based office scan service to implement policy-based scanning. Thus, a user may scan as many documents as possible using the public scan service and incur high costs because the policy is not applied to limit the scanning operations.

In policy-based scanning system 1000, office scan service 1010 and public scan service 1020 are able to communicate and exchange data using connection 1005. Connection 1005 may be a websocket connection authenticated and implemented using operations similar to operations disclosed in FIG. 3. Office scan service 1010 may subscribe or pay to use public scan service 1020. Office scan service 1010 may be distinguished by its network domain. In some embodiments, this domain may be similar to private domain 120 or 130. Access to the private domain may be limited, for example, by firewall 1001. Public scan service 1020 may access office scan service 1010 using the domain for private server 1012.

Office scan services 1010 includes private server 1012. Private server 1012 of office scan service 1010 may correspond to private policy server 128 in private domain 120, disclosed above. Private server 1012, however, may include the functions and features of private authentication server 124 and private job server 126. Private server 1012 also may include one or more policies to apply to scan jobs for users within the organization.

Office scan service 1010 also includes at least one scanning device 1014 to scan and send documents to private server 1012. Scanning device 1014 may be similar to scanner components 224 of printing device 104 disclosed above. Scanning device 1014 may be located in a private or company setting where office scan service 1010 manages documents. A user employed or engaged by the company or organization may use scanning device 1014 to scan documents. Scanning device 1014 may include device identification 1015, which uniquely identifies the scanning device within office scan service 1010. Device identification 1015 may be an IP address or other designation address to identify scanning device 1014 when performing scan jobs.

Document 1002 may be a document stored on private server 1012 after being scanned by scanning device 1014. The user may instruct scanning device 1014 to scan document 1002 using office scan service 1010. Office scan service 1010 may receive a request 1034 from the user through user device 1008. User device 1008 also may receive document 1002 from scanning device 1014. User device 1008 may be a computer, laptop, mobile device or tablet, kiosk attached to office scan service 1010, and the like. If a mobile device, then user device 1008 may include a mobile application 1009 to facilitate the management and scanning of documents within system 1000. In some embodiments, mobile application 1009 may configure user device 1008 to manage scanning operations and documents within system 1000. The user may select scanning device 1014 to scan document 1002 using mobile application 1009, which then generates request 1034.

Alternatively, the user may request to scan document 1002 through scanning device 1014. The user enters information to scan document 1002 to be sent to private server 1012. Request 1034 is generated at scanning device 1014 and sent to private server 1012 using office scan service 1010.

Upon receipt of request 1034, private server 1012 may apply an applicable policy and any credit values to the scan job for document 1002. The organization of the user may place limits on what and how much the user may scan within the office or corporate setting. Further, a policy may limit the type of scanning operations that the user may perform, as disclosed above with regard to policy 142. Limits also may be placed on the costs incurred and data size of scan jobs for the user. These limits are applied to the scan job for document 1002 at scanning device 1014.

If private server 1012 allows the scan job, then a notification 1036 may be sent to the user that the scan job may be performed. Notification 1036 also may be sent to scanning device 1014 along with instructions to scan document 1002. Alternatively, notification 1036 may be sent to user device 1008. Mobile application 1009 may receive notification 1036 and display this information to the user. Additional information also may be included or sent separately after further operations are performed at scanning device 1014, such as entering a code to scan document 1002 provided by notification 1036. Scanning device 1002 scans document 1002 accordingly. An image file of document 1002 is generated. The image file may be an electronic document also referred to as document 1002 below for brevity. The image file may be sent to private server 1012 to be stored until retrieval by the user. Statistics may be generated by the scanning operations at scanning device 1014.

Public scan service 1020 also may implement many of the same features of office scan service 1010. It includes public server 1022. As disclosed above, public server 1022 may be a cloud-based server managing different scanning devices within public scan service 1020. Public server 1022 may correspond to public policy server 112 of public domain 110, disclosed above. Public server 1022 also may include the functions and features of public file server 114. Public server 1022 may communicate with private server 1012 through connection 1005.

Public scan service 1020 also includes at least one scanning device 1024 having device identification 1025. Scanning device 1024 is used in the public domain by public scan service 1020. Unlike scanning device 1014, scanning device 1024 may be used by a variety of users in different organizations subscribing to public scan server 1020. It is not dedicated to the domain for office scan services 1010. Scanning device 1024 is connected to public server 1022, which may instruct the scanning device whether to perform a scan job. Scanned documents from scanning device 1024 may be stored on public server 1022.

Public server 1022 includes policy 1016 and ledger 1018. Policy 1016 is similar to the policies disclosed above. Policy 1016 also may include parameters, or limits, regarding the total costs for scanning using public scan service 1020. It also may include quota limits that impose restrictions on the amount of data scanned or used from public server 1022 or public scan service 1020. Ledger 1018 is disclosed in greater detail by FIG. 11. Ledger 1018 may include records of transactions performed by public scan service 1020. Policy 1016 may be stored on public server 1022 so that scanning operations and management of documents are done in public scan service 1020 as opposed to office scan service 1010. This feature may reduce the amount of interaction between the private and public domains. Further, this feature allows public scan service 1020 to control scanning operations.

Administrator device 1006 may interact with public scan service 1020 by setting policy 1016 and providing values used to scan documents, such as credit values and quota values. Administrator device 1006 may be used by an administrator or other person to manage public scan service 1010 for the organization. Using policy 1016 and public server 1022, the administrator may manage public scan service 1020 using various features of the disclosed embodiments. As shown in FIG. 10, policy credit value 1030 and quota value 1032 may be set using administrator device 1006. These values are disclosed in greater detail below. In some embodiments, administrator device 1006 also may be implemented with office scan service 1010.

Document 1004 may be scanned and stored on public server 1022 for later retrieval by the user. The user may identify document 1004 to be scanned at scanning device 1024 having device identification 1025. Charges may be incurred as well as data size used for the scan job. The organization, using administrator device 1006, may wish to limit the amount of scanning done using public scan service. Conventionally, the costs may be accrued and presented to the organization to pay or reimburse. According to the disclosed embodiments, limits are placed on the amount of scanning that may be done using policy 1016 and ledger 1018, as may be done in public scan service 1020.

The user submits request 1038 using user device 1008, mobile application 1009, or scanning device 1024 to scan document 1004. The request is received at public server 1022. Before scanning document 1004 by scanning device 1024, public server 1022 identifies the domain for the user to identify policy 1016 for application to determine whether to allow the scan job. The domain may be identified using the information, such as an email address of the user. The domain of the email address may be used to obtain a uniform resource locator (URL) address for the domain. Public server 1024 then may use information provided about policy 1016 and remaining values from ledger 1018 to determine whether to allow the scan job for document 1004 at scanning device 1024.

If the scan job is acceptable, then public server 1022 generates notification 1040 that is sent to scanning device 1024. Alternatively, notification 1040 may be sent to user device 1008 or mobile application 1009. Notification 1040 may include information or a code to scan the document when presented at scanning device 1024. Scanning device 1024 may generate statistics including the costs incurred and any data amounts used for completing the scan job. The image file generated by scanning device 1024 is the electronic document of document 1004, which also may be referred to as document 1004. Scanning device 1024 sends the electronic document for document 1004 to public server 1022. Public server 1022 stores the scanned document for later retrieval by the user. In some embodiments, the scanned document may be forwarded to private server 1012. The statistics generated by the scanning operations are sent to update ledger 1018 accordingly.

The scan job may be denied and subsequently cancelled. Policy 1016 may indicate that the scan job is not allowed for the user. The scan job may violate one or more of the parameters set forth in the policy. Further, not enough credit value or quota value may remain to perform the scan job. The user may have reached his/her limits for the policy period and cannot exceed these limits absent some action taking through administrator device 1006. For example, the administrator for the organization using public scan service 1020 may allow a temporary overage situation for the policy period. Thus, notification 1040 may be an alert indicating that the document will not be scanned at the applicable scanning device. It also may include instructions to cancel the scan job at the applicable scanning device.

Figure 11:
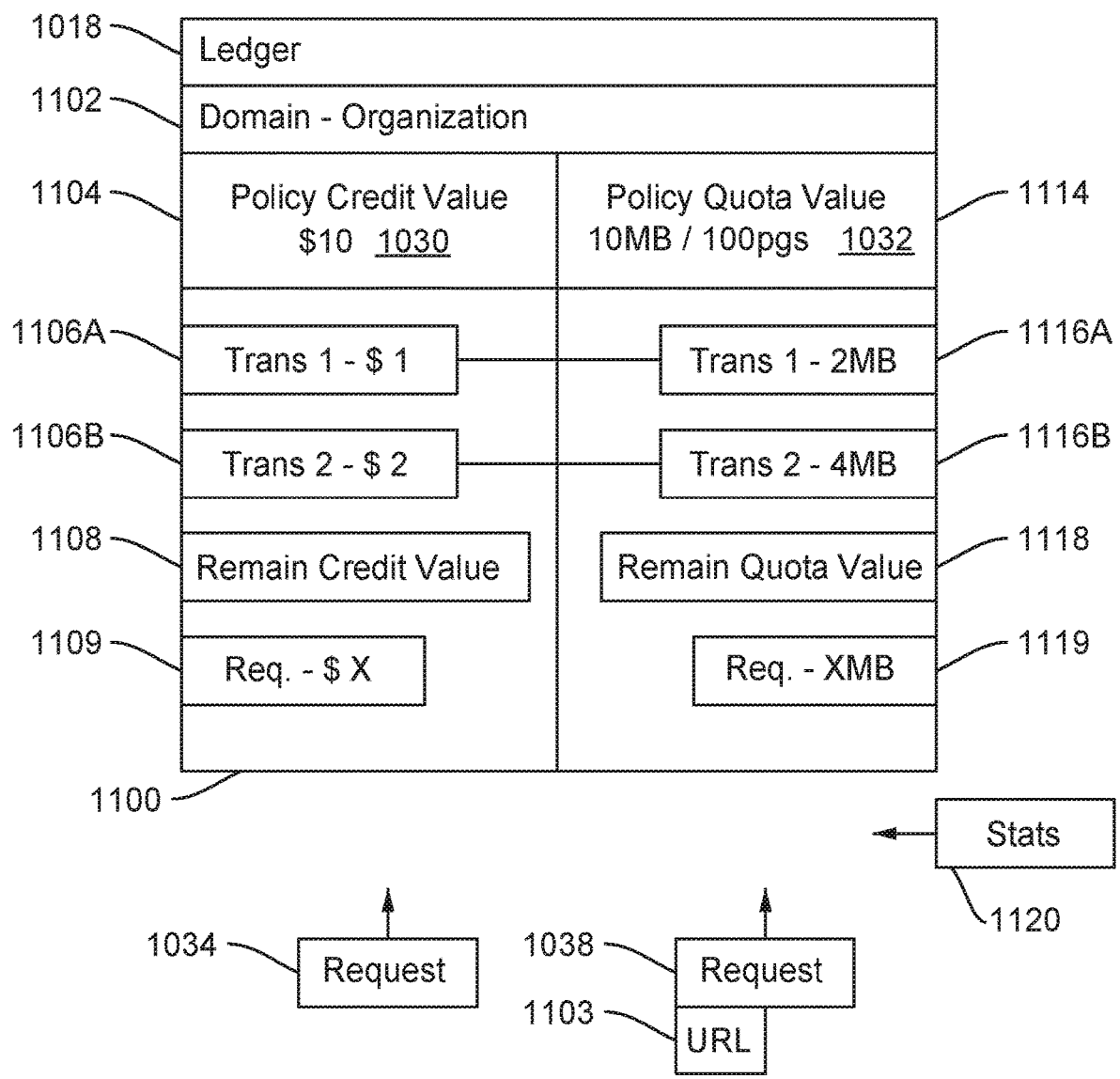
FIG. 11 illustrates a ledger for use in policy-based scanning operations according to the disclosed embodiments.

FIG. 11 depicts ledger 1018 for use in policy-based scanning operations according to the disclosed embodiments. FIG. 11 shows some of the features disclosed above by FIG. 10 in greater detail. Ledger 1018 may store information that is used in determining whether to allow a scan job using public scan service 1020. Ledger 1018 may be a table or file stored on public server 1022 to record transactions generated by the user in public scan service 1020. The fields and entries shown in ledger 1018 are for illustrative purposes only. Other means for storing the information used by ledger 1018 may be used.

Table 1100 may be in ledger 1018 for the user. The user may belong to an organization corresponding to a domain, shown as domain 1102. Domain 1102 may be related to a URL address for private server 1012, and identified using the URL address in a request for a scan job. Domain 1102 may be a field in table 1100 that stores this information. The URL address is used by public server 1022 to identify the appropriate domain to query for scan jobs for the user.

Table 1100 also may include fields for parameters that vary over time due to the transactions. These fields include values that are used to determine whether to allow a scan job using public scan service 1020. For illustrative purposes, the features of ledger 1018 will be disclosed as using public scan service 1020. The same features also may apply to scan jobs using office scan service 1010.

For the user, policy 1016 may be used to limit scan jobs according to certain parameters, such as only black and white scanning, security levels, and the like, as disclosed above. For example, policy 1016 may not allow the user to scan color documents or pictures. One parameter may be costs, as shown in FIG. 4B in that the user may not exceed a certain amount of scanning costs for a policy period. To track incurred costs, ledger 1018 records transactions and adjusts a remaining credit value 1108 for the user. Thus, credit field 1104 includes information to determine the remaining credit value for the user.

Credit field 1104 includes a policy credit value 1030. Policy credit value 1030 may be set by an administrator based on factors, such as the contract with the organization, the access level of the user, budgeted usage, and the like. Policy credit value 1030 may be sent or set at ledger 1018 using administrator device 1006. Policy credit value 1030 is stored in credit field 1104. For the most part, policy credit value 1030 does not change during a policy period. It sets the limit on how much the user may charge to the organization for scanning. In some embodiments, policy credit value 1030 may differ between organizations for scanning using public scan service 1020. Alternatively, policy credit value 1030 may place a limit on all scanning using public scan service 1020.

Scan jobs for the user results in entries for the transactions being created in credit field 1104. Thus, transactions 1106A and 1106B may reflect two scan jobs already performed for the user during the current policy period. Information for these transactions may include costs, time/date, device identification for the scanning device, whether it is a private or public scan job, and the like. When a request for a new scan job is received, the costs of the transactions are compiled to determining remaining credit value 1108.

For example, policy credit value 1030 may be $10 for a policy period. The user may incur scanning costs up to $10 before requests will be denied. Transaction 1106A incurred a cost of $1 while transaction 1106B incurred a cost of $2. Thus, remaining credit value 1108 is $7. A scan job will be allowed as long as it does not cost more than $7. Ledger 1018 is notified of a pending request for a scan job. In some embodiments, request 1038 is received from public scan service 1020. The request may include an estimated transaction 1109 having a cost of $X. If X is $5, then the scan job will be allowed. If X is $8, then the scan job will be denied as it exceeds remaining credit value 1108.

If request 1038 is received in public scan service 1020 at public server 1022, then URL address 1103 may be used to determine which domain 1102 to query with the user's information. Request 1038 may simply be the estimated cost and not the actual cost to scan document 1004. The URL address is determined by public server 1022 based on information provided by the user, such as an email address. The email address will indicate the domain of the user, which then is used to obtain URL address 1103. Determination of domains may be disclosed above by FIG. 4A.

Table 1100 also includes quota field 1114 to determining a remaining quota value 1118 for the user. Quota value may refer to a parameter other than cost to limit scanning operations for the user, such as total data or scanned pages generated for scan jobs during a policy period. For example, the user may be limited to scanning up to 10 MB of data for a policy period. Another example may be limiting the user to scanning 100 pages within a policy period. The data limit may be more applicable when the user is scanning documents having complex graphics or information as opposed to text. Much like policy credit value 1030, policy quota value 1032 may be set by policy 1016 or the administrator using administrator device 1006.

Quota field 1114 also includes entries for transactions corresponding to those in credit field 1104. Thus, transaction 1116A corresponds to transaction 1106A and includes the amount of data used to accomplish the scan job. Transaction 1116B corresponds to transaction 1106B. The corresponding transactions may share certain information such as time/data, scanning location, and the like. The determination of remaining quota value 1118 also is determined by compiling the amount of data used in the previous transaction and comparing the compiled amount to policy quota value 1032. Using the above example, transaction 1116A used 2 MB of data while transaction 1116B used 4 MB of data. If using pages, then the number of scanned pages may be compiled. If policy quota value 1032 is 10 MB, then remaining quota value 1118 is 4 MB. The user may scan up to 4 MB of data.

When the request for the new scan job is received, the estimated size of the scan job is shown as estimated transaction 1119. The estimated quota size may be X MB. If X is 2 MB, then the scan job should be allowed. If X is 6 MB, then the scan job will be denied. In some embodiments, if the estimated cost and size of the scan job fails to be within the parameters for remaining credit value 1108 or remaining quota value 1118, then the scan job will not be allowed. Alternatively, if either the estimated cost or size is acceptable, then the scan job may proceed. The appropriate notification may be generated by public server 1022 and sent to the appropriate device, either scanning device 1024 or user device 1008.

After scanning operations are complete, the scanning device performing the scan job will generate statistics 1120 and send them to update ledger 1018. Entries will be made into credit field 1104 and quota field 1114 for the transaction. Statistics 1120 may include the actual cost and size of the scan job, which may differ from the estimated amounts used in determining whether to allow the scan job. Statistics 1120 may be generated for scanning operations using public scan service 1020.

Figure 12:
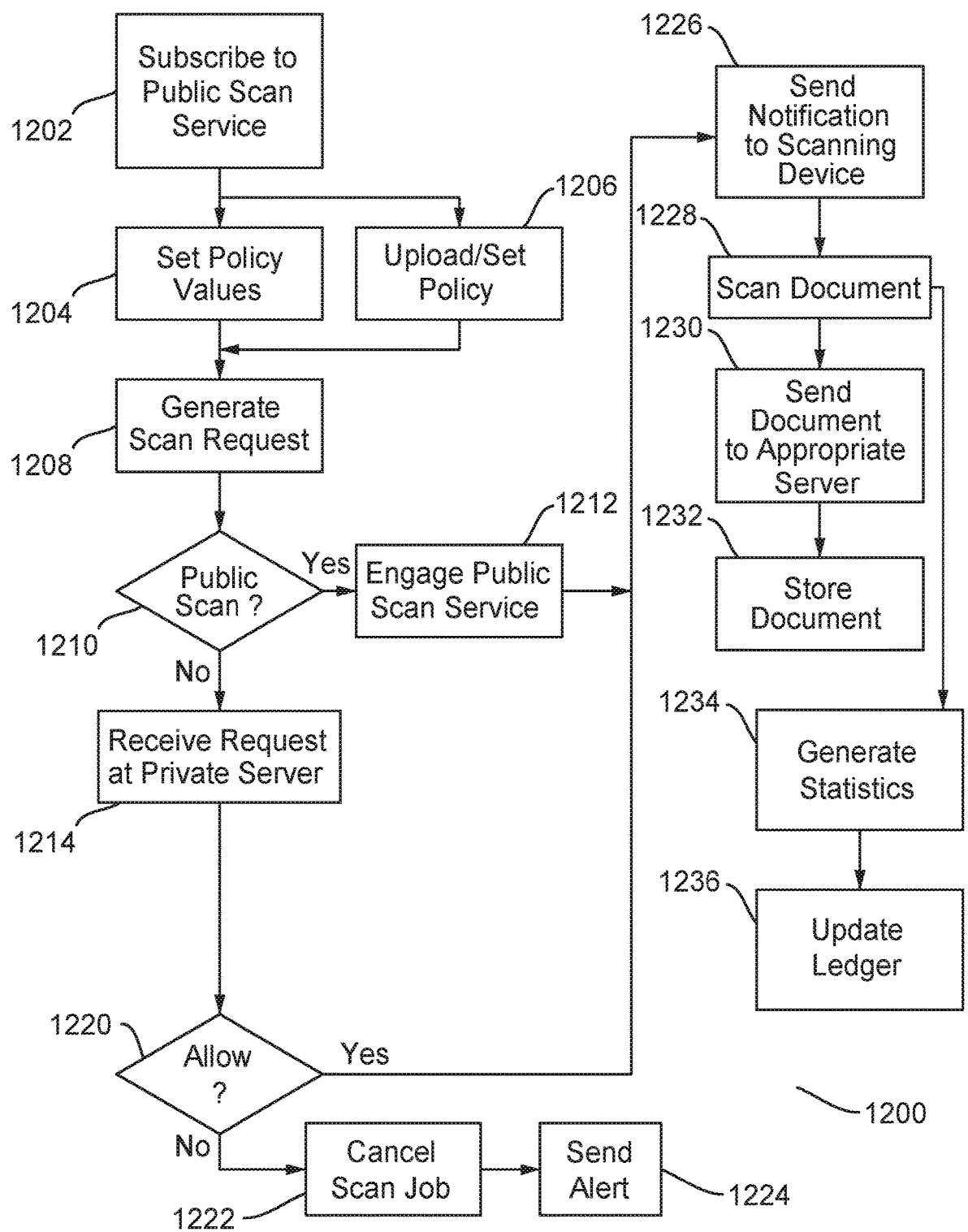
FIG. 12 illustrates a flowchart for scanning a document using the policy-based scanning system according to the disclosed embodiments.

FIG. 12 depicts a flowchart 1200 for scanning a document using policy-based scanning system 1000 according to the disclosed embodiments. The features disclosed by FIGS. 1-11 may be used to illustrate the embodiments of FIG. 12. Flowchart 1200, however, may not be limited by FIGS. 1-11.

Step 1202 executes by subscribing the organization having office scan service 1010 to public scan service 1020. Public scan service 1020 may have relationships with several office scan services. Public scan service 1020 also allows a user of office scan service 1010 to have access to a large number of scanning devices in the public domain. The users within the organization may have access to scanning devices outside office scan services 1010. This step also includes the organization of office scan services 1010 providing information including a URL address or addresses for identifying users during scanning operations. For example, the subscription action may include one or more URL addresses 1103 used within the organization. Email addresses having the same domain as URL address 1103 may be verified using the appropriate policy at public server 1022.

Step 1204 executes by uploading or setting policy 1016 at public server 1012. Policy 1016 may be applied to scan jobs to allow or deny them according to the parameters in the policy. A policy may apply to a user, but also may be set for the organization. Step 1206 executes by setting policy values for the user or the organization. For example, a policy credit value 1030 and a policy quota value 1032 may be set for a policy period. The user may not exceed these values for scan jobs in the policy period. An administrator may set these values. Alternatively, the values may be set in policy 1016.

Step 1208 executes by generating request 1034 or 1038 to scan a document at a scanning device. The user may request to scan document 1002 at scanning device 1014 or document 1004 at scanning device 1024. Thus, the request may be generated at either device, depending on which scan service to use. The request may be submitted at the scanning device by the user or sent to the scanning device from user device 1008. The user may launch mobile application 1009 to request a scan job. The request may include a user name and password to verify the user within the appropriate scan service. The user may enter this information at the scanning device or send it using user device 1008. The user information is validated. If the user information is not valid, then the scanning device may indicate this to the user and request that the information be re-entered. Otherwise, the scanning operations may be stopped.

Step 1210 executes by determining whether a possible scan job will be a public scan job. In other words, if the user wishes to scan a document, then flowchart 1200 determines whether it is to be done using public scan service 1020. For example, a request 1034 indicates a scan job using office scan server 1010. A request 1038 indicates a scan job using public scan service 1020. If yes, then step 1212 executes by engaging public scan service 1020. Public scan service 1020 may be a cloud-based platform that connects cloud-based public servers and scanning devices in the public domain. Step 1210 is disclosed in greater detail by FIG. 13.

If step 1208 is no, then the scan job is to be performed in the private domain, or office scan service 1010. The remaining steps should correspond to office scanning in the organization of the user. Step 1214 executes by receiving request 1034 to scan document 1002 at private server 1012. Private server 1012 may use information provided by the user to determine if a policy corresponds to the scan job. As disclosed above by FIGS. 3 and 6-9, a policy may be used to determine whether the parameters for the print job are acceptable in the private domain. These same features may be applied to determine whether a scan job is acceptable.

Step 1220 executes by determining whether to allow the scan job of document 1002 within office scan service 1010. If step 1220 is no, then step 1222 executes by cancelling the scan job within office scan services 1010. Private server 1012 denies access to document 1002. Step 1224 executes by sending an alert to scanning device 1014. The alert may be notification 1036. The alert also may be sent to user device 1008 to notify the user so that he/she may take some action to still scan document 1002.

If step 1220 is yes, then document 1002 may be scanned using office scan service 1010. Step 1226 executes by sending notification 1036 to scanning device 1014. Step 1228 executes by scanning document 1002 at scanning device 1014. An image file is generated by the scanning operations. The image file may be an electronic document of document 1002. Step 1230 executes by sending the electronic document for document 1002 to private server 1012. Step 1234 executes by generating statistics 1120 for the scan job at scanning device 1014. Step 1236 executes by updating a ledger at private server 1012 with statistics 1120, if applicable. In some embodiments, an entry may be made in ledger 1018 on public server 1022 for the transaction information associated with the scan job, such as cost, data size, time/date, and the like.

It should be noted that steps 1226-36 also are executed for a scan job using public scan service 1020, with slight modifications as disclosed below.

Figure 13:
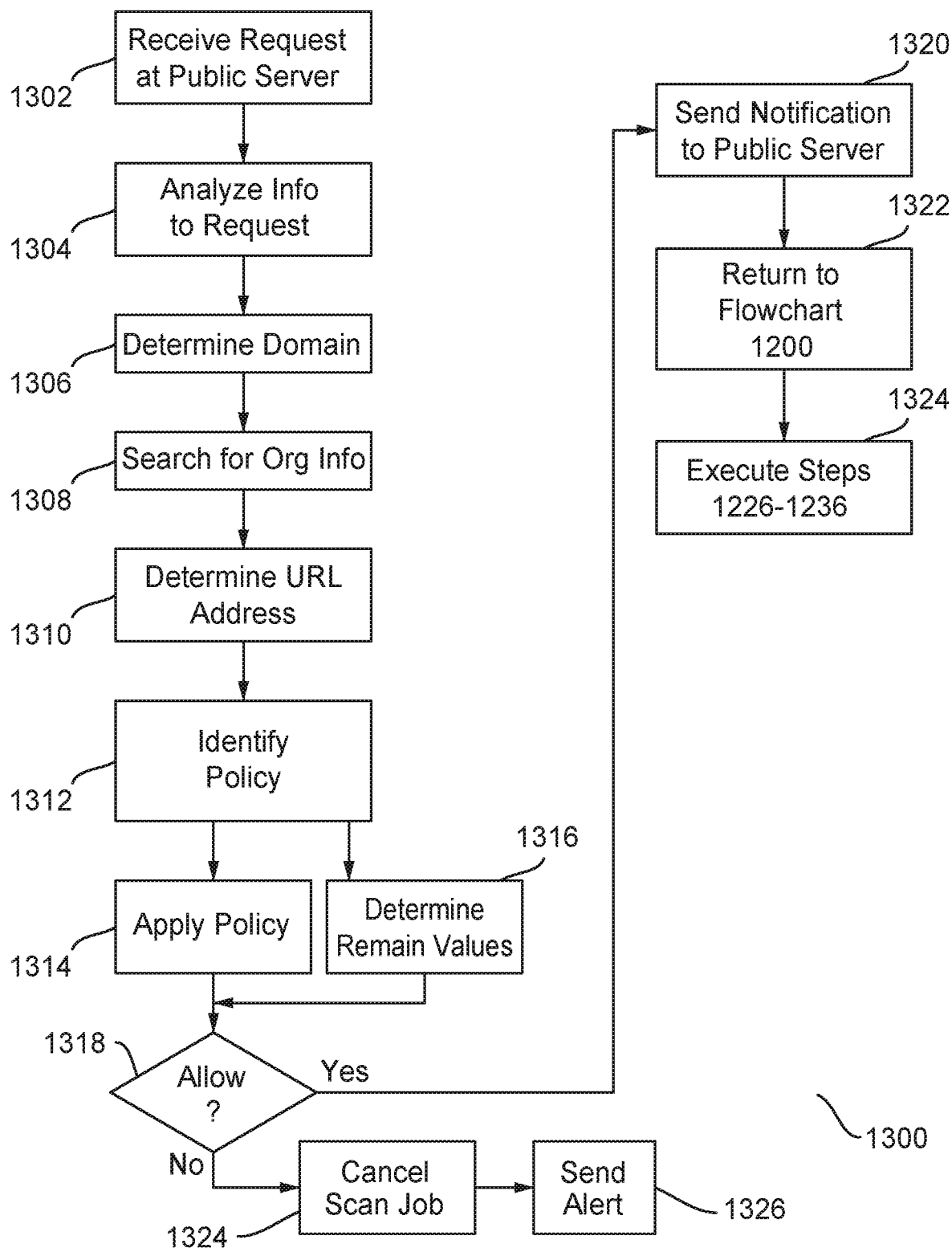
FIG. 13 illustrates a flowchart for scanning the document using the public scan service according to the disclosed embodiments.

FIG. 13 depicts a flowchart 1300 for printing a document using public scan service 1020 according to the disclosed embodiments. The features disclosed by FIGS. 1-12 may be used to illustrate the embodiments of FIG. 13. Flowchart 1300, however, may not be limited by FIGS. 1-12.

In step 1210 of flowchart 1200, it was determined that the scanning operations are to be performed by public scan service 1020. The user may be outside the office environment and not able to access office scan service 1010. Office scan service 1010 subscribes to public scan service 1020 so that its users may scan documents using the public scanning devices available within the public scan service. Thus, the user scans document 1004 on scanning device 1024. The user also may store document 1004 on public server 1022 for access within public scan service 1020. In some embodiments, document 1004 may be sent to user device 1008 instead. The user can decide whether to store the scanned document on public server 1022. Alternatively, the scanned document may be forwarded to private server 1012 from public server 1022 for use within office scan services 1010.

Step 1302 executes by receiving request 1038 at public server 1022. The request may include user information such as organization name, email, user name, password, and the like. As disclosed above, request 1038 may be generated at scanning device 1024 in public scan service 1020. In other embodiments, request 1038 may be generated at user device 1008. The user may use mobile application 1009 to select scanning operations for document 1004 at a public scanning device. Mobile application 1009 generates request 1038 along with the user information available to the application. Thus, step 1302 may execute, if applicable, by receiving request 1038 to scan document 1004 at scanning device 1024. Alternatively, the user may use a kiosk to request a scan job for the document. Public server 1022 may verify that request 1038 is valid and within public scan service 1020. Public server 1020 also may note that the scan job is to be performed at scanning device 1024.

Step 1304 executes by analyzing the user information in request 1038. Public server 1022 may verify that the user name and password are correct for the user. It also may use this information to determine an email address for the user. Step 1306 executes by determining the applicable domain for the user. As disclosed above in FIG. 4A, the domain may determine the applicable organization and the corresponding policy to apply. Public server 1022 may use the email address for the user to identify the domain. The domain also may identify that office scan service 1010 is subscribed to public scan service 1020.

Using the domain information, step 1308 executes by searching for organization information. Organization information may include name of organization and associated URL addresses. Public server 1022 also may apply any policy limitations available at this point. Once the organization is determined, public server 1022 may apply some general rules to request 1038, such as no scanning on weekends or after business hours, and the like. Step 1310 executes by determining URL address 1103 for the organization in the user information. Alternatively, the disclosed embodiments may use the email address of the user to search URL addresses for organizations serviced by public scan service 1020.

Step 1312 executes by identifying policy 1016 and table 1100 within ledger 1018 for the organization. As the service is a cloud-based service, the organization subscribing to public scan service 1020 may be identified by its URL address. Public server 1022 stores policy 1016 and supports ledger 1018. Thus, it may retrieve policy 1016 and analyze ledger 1018 to determine whether to allow the requested scan job.

Step 1314 executes by applying policy 1016 to the scan job request for document 1004. Step 1316 also executes by determining the remaining values for the credit and quota parameters as well. These steps may execute simultaneously or in a certain order, such as applying policy 1016 before determining whether enough remaining credit value is left to scan the document. Ledger 1018 may be used to determine remaining credit value 1108 and remaining quota value 1118, as disclosed above.

Step 1318 executes by determining whether to allow the scan job for document 1004 at scanning device 1024. In some embodiments, public server 1022 may make this determination by making sure the scan job meets the requirements set forth in policy 1016 and that enough remaining credit or quota value is available to process the scan job. Alternatively, another component within public scan service 1020 may make this determination. Policy 1016 may be sent to public server 1022 to apply it to requested scan jobs. Further, remaining credit value 1108 and remaining quota value 1118 may be forwarded to public server 1022. In other embodiments, only the remaining values are sent to public server 1022 while policy 1016 is applied at the public server. As public scan service 1020 is cloud-based, information may be shared over the cloud network to facilitate scanning operations.

If step 1318 is no, then step 1324 executes by cancelling the scan job, much like step 1222 disclosed above. Public server 1022 may flag further scan job requests from the user and deny them as well until a communication is received from office scan service 1010 to allow the user to use public scan service 1020. Step 1326 executes by sending an alert or notification 1040 to the user. Notification 1040 may be sent to user device 1008. Mobile application 1009 may display the alert on user device 1008. Alternatively, notification 1040 may be sent to scanning device 1024 to display to the user and cancel scanning operations.

If step 1318 is yes, then step 1320 executes by sending notification 1040 from public server 1022. If the determination is performed at public server 1022, then public server 1022 generates notification 1040. Step 1322 executes by returning to flowchart 1200. The remaining steps are similar to the ones performed for scanning in office scan service 1010 with some differences, disclosed below. Step 1324 executes steps 1226 to 1236 to implement scanning in public scan service 1020 following the below disclosed embodiments.

Returning back to flowchart 1200 to execute steps 1226 to 1236 in a public scan service 1020, step 1226 executes by sending notification 1040 to scanning device 1024. Notification 1040 may operate as notification 1036 disclosed above. It may include a code for the user to enter onto scanning device 1024 to commence scanning operations for document 1004. Step 1228 executes by scanning document 1004 at scanning device 1024. Scanning device 1024 completes the scan job and generates an image file of document 1004. The image file may be an electronic document of document 1004 but also referred to as document 1004 for brevity. Scanning device 1024 may store the image file as well as make it available to the user to review.

Step 1230 executes by sending the electronic document from scanning device 1024 to public server 1022. Public server 1022 also may forward the electronic document to private server 1012 for storing in office scan server 1010. The user may want to keep a copy of document 1004 at the company or organization for retrieval later. Public server 1022 may send the scanned document to the URL address for private server 1012 in a cloud-based service. Public server 1022 also may forward the scanned document to user device 1008. The user may view the scanned document on user device 1008. Mobile application 1009 also may allow the user to modify or manage the scanned document. Step 1232 executes by storing the scanned document at public server 1022. Further, the scanned document may be stored at another server, such as private server 1012.

Step 1234 executes by generating statistics 1120 for the scan job. Step 1236 executes by updating ledger 1018 with statistics 1120. These steps are disclosed above. Public server 1022 also may store and use statistics 1120 in generating reports from public scan service 1020.

In some embodiments, the scanned document may be stored at scanning device 1024 and stored for period for time, after which the data for the scanned document is deleted from the scanning device. This feature prevents data from being stored over time at scanning device 1024. Instead, the data for the scanned document may be sent to public server 1022. Problems may occur if the scanned information is kept at scanning device 1024, such as using the memory or other resources on the scanning device. Further, the user or the organization may not want its scanned documents saved on scanning device 1024 for possible access by third parties. As public server 1022 is cloud-based, it should not be accessible by other users of scanning device 1024.

Figure 14:
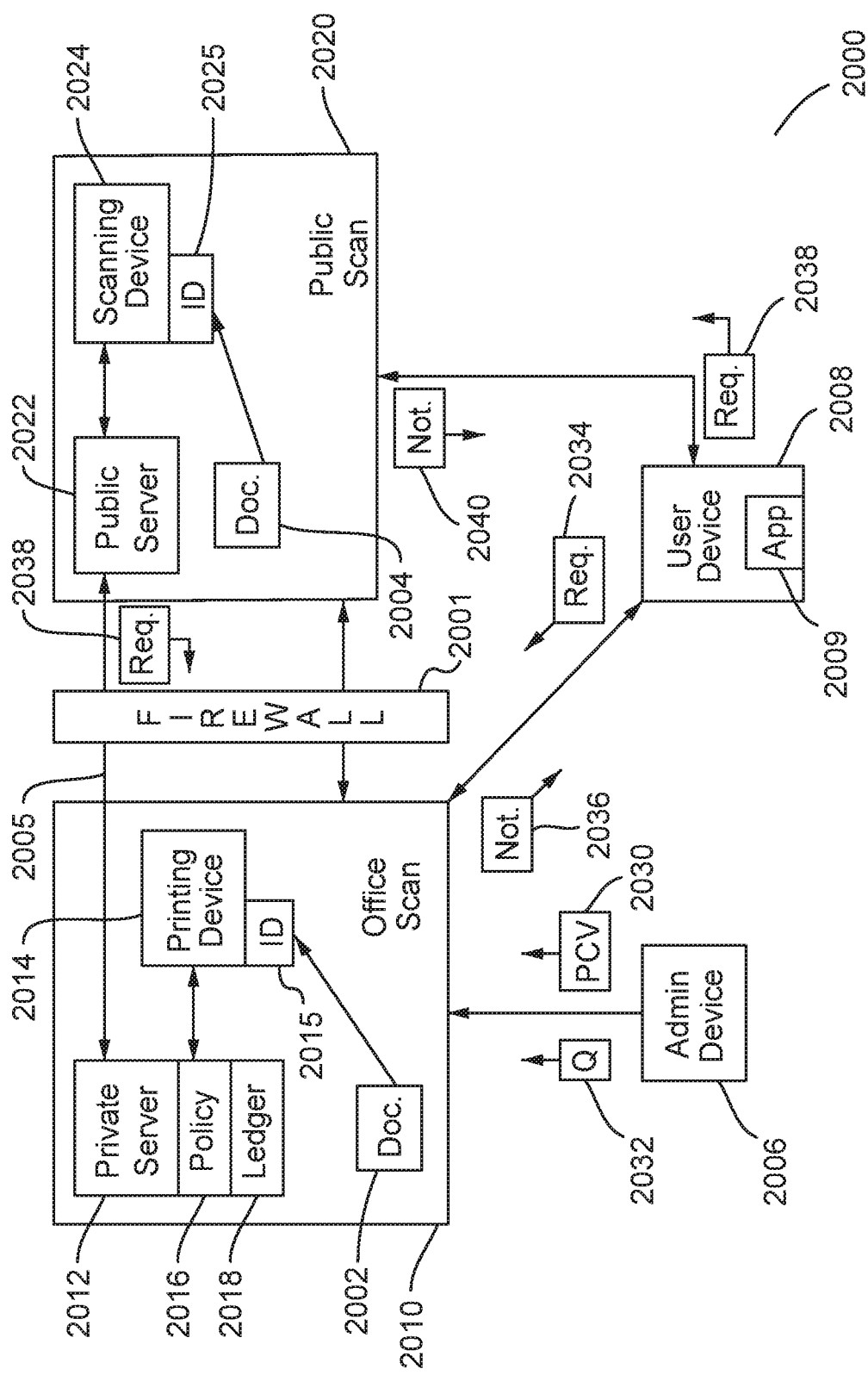
FIG. 14 illustrates another policy-based system to implement policy-based scanning using a public scan service according to the disclosed embodiments.

FIG. 14 depicts another policy-based scanning system 2000 to implement policy-based scanning using a public scan service 2020 according to the disclosed embodiments. System 2000 may differ from system 100 disclosed above in that it also includes an office scan service 2010 and a public scan service 2020. Although system 2000 discloses a scanning system, the features disclosed above with regard to FIGS. 1-13 also may apply here. System 2000 may use the processes disclosed above to authenticate a scanning device and scan documents using the scanning device according to a policy. Referring to FIG. 2 disclosed above, printing device 104 includes scanner components 224. Thus, a scanning device also may be a printing device according to some embodiments.

Both scan services may be cloud-based scan services. Scanning operations may be managed in the cloud. Private server 2012 and public server 2022 may be cloud-based servers in that using network connections, users may be able to access these servers as well as the services provided by office scan service 2010 and public scan service 2020. For example, public scan service 2020 may use a network of remote servers and scanning devices on the internet or network 102 to store, manage, and process data for documents. In some embodiments, public scan service 2020 may be a platform-as-a-service cloud scanning service.

Many companies and organizations use office scan services with scan policy and credit features to control the scan volume in the office. Some of these services are cloud-based. An organization wishes to track and limit the amount of scanning done in the office. In some embodiments, the user also can use a cloud-based public scan service outside the office. The public scan service does not integrate with the cloud-based office scan service to implement policy-based scanning. Thus, a user may scan as many documents as possible using the public scan service and incur high costs because the policy is not applied to limit the scanning operations.

In policy-based scanning system 2000, office scan service 2010 and public scan service 2020 are able to communicate and exchange data using connection 2005. Connection 2005 may be a websocket connection authenticated and implemented using operations similar to operations disclosed in FIG. 3. Office scan service 2010 may subscribe or pay to use public scan service 2020. Office scan service 2010 may be distinguished by its network domain. In some embodiments, this domain may be similar to private domain 120 or 130. Access to the private domain may be limited, for example, by firewall 2001. Public scan service 2020 may access office scan service 2010 using the domain for private server 2012.

Office scan services 2010 includes private server 2012. Private server 2012 of office scan service 2010 may correspond to private policy server 128 in private domain 120, disclosed above. Private server 2012, however, may include the functions and features of private authentication server 124 and private job server 126. Private server 2012 may include policy 2016 and ledger 2018. Policy 2016 is similar to the policies disclosed above. Policy 2016 also may include parameters, or limits, regarding the total costs for scanning using public scan service 2020. It also may include quota limits that impose restrictions on the amount of data scanned or used by the user. Ledger 2018 is disclosed in greater detail by FIG. 15. Ledger 2018 may include records of transactions performed by office scan service 2010 and public scan service 2020.

Office scan service 2010 also includes at least one scanning device 2014 to scan and send documents to private server 2012. Scanning device 2014 may be similar to scanner components 224 of printing device 104 disclosed above. Scanning device 2014 may be located in a private or company setting where office scan service 2010 manages documents. A user employed or engaged by the company or organization may use scanning device 2014 to scan documents. Scanning device 2014 may include device identification 2015, which uniquely identifies the scanning device within office scan service 2010. Device identification 2015 may be an IP address or other designation address to identify scanning device 2014 when performing scan jobs.

Administrator device 2006 may interact with office scan services 2010 by setting policy 2010 and providing values used to scan documents, such as credit values and quota values. Administrator device 2006 may be used by an administrator or other person to manage office scan services 2010 for the organization. Using policy 2010 and private server 2012, the administrator may manage public scan service 2020 as well. As shown in FIG. 14, policy credit value 2030 and quota value 2032 may be set using administrator device 2006. These values are disclosed in greater detail below. In some embodiments, administrator device 2006 may be implemented with private service 2012.

Document 2002 may be a document stored on private server 2012 after being scanned by scanning device 2014. The user may instruct scanning device 2014 to scan document 2002 using office scan service 2010. Office scan service 2010 may receive a request 2034 from the user through user device 2008. User device 2008 also may receive document 2002 from scanning device 2014. User device 2008 may be a computer, laptop, mobile device or tablet, kiosk attached to office scan service 2010, and the like. If a mobile device, then user device 2008 may include a mobile application 2009 to facilitate the management and scanning of documents within system 2000. In some embodiments, mobile application 2009 may configure user device 2008 to manage scanning operations and documents within system 2000. The user may select scanning device 2014 to scan document 2002 using mobile application 2009, which then generates request 2034.

Alternatively, the user may request to scan document 2002 through scanning device 2014. The user enters information to scan document 2002 to be sent to private server 2012. Request 2034 is generated at scanning device 2014 and sent to private server 2012 using office scan service 2010.

Upon receipt of request 2034, private server 2012 applies policy 2016 and any credit values to the scan job for document 2002. The organization of the user may place limits on what and how much the user may scan within the office or corporate setting. Further, policy 2016 may limit the type of scanning operations that the user may perform, as disclosed above with regard to policy 142. Limits also may be placed on the costs incurred and data size of scan jobs for the user. These limits are applied to the scan job for document 2002 at scanning device 2014.

If policy 2016 allows the scan job and the remaining values are adequate, then a notification 2036 may be sent to the user that the scan job may be performed. Notification 2036 also may be sent to scanning device 2014 along with instructions to scan document 2002. Alternatively, notification 2036 may be sent to user device 2008. Mobile application 2009 may receive notification 2036 and display this information to the user. Additional information also may be included or sent separately after further operations are performed at scanning device 2014, such as entering a code to scan document 2002 provided by notification 2036. Scanning device 2014 scans document 2002 accordingly. An image file of document 2002 is generated. The image file may be an electronic document also referred to as document 2002 below for brevity. The image file may be sent to private server 2012 to be stored until retrieval by the user. Statistics may be generated by the scanning operations at scanning device 2014 and sent to update ledger 2018.

Public scan service 2020 also may implement many of the same features of office scan service 2010. It includes public server 2022. Public server 2022 may correspond to public policy server 112 of public domain 110, disclosed above. Public server 2022 also may include the functions and features of public file server 114. Public server 2022 may communicate with private server 2012 through connection 2005, especially when access to policy 2016 and ledger 2018 are needed to process scan jobs.

Public scan service 2020 also includes at least one scanning device 2024 having device identification 2025. Scanning device 2024 is used in the public domain by public scan service 2020. Unlike scanning device 2014, scanning device 2024 may be used by a variety of users in different organizations subscribing to public scan server 2020. It is not dedicated to the domain for office scan services 2010. Scanning device 2024 is connected to public server 2022, which may instruct the scanning device whether to perform a scan job. Scanned documents from scanning device 2024 may be stored on public server 2022.

Document 2004 may be scanned and stored on public server 2022 for later retrieval by the user. The user may identify document 2004 to be scanned at scanning device 2024 having device identification 2025. Charges may be incurred as well as data size used for the scan job. The organization, using administrator device 2006, may wish to limit the amount of scanning done using public scan service.

Conventionally, the costs may be accrued and presented to the organization to pay or reimburse. According to the disclosed embodiments, limits are placed on the amount of scanning that may be done using policy 2016 and ledger 2018, as may be done in office scan service 2010.

The user submits request 2038 using user device 2008, mobile application 2009, or scanning device 2024 to scan document 2004. The request is received at public server 2022. Before scanning document 2004 by scanning device 2024, public server 2022 sends request 2038 to private server 2012 to determine whether to allow the scan job. The process may be similar as disclosed above within office scan service 2010, except that the user submits information identifying the domain for the organization. The domain may be identified using the information, such as an email address of the user. The domain of the email address may be used to obtain a uniform resource locator (URL) address for private server 2012 within the domain. Public server 2024 then may use information provided about policy 2016 and remaining values from ledger 2018 to determine whether to allow the scan job for document 2004 at scanning device 2024.

If the scan job is acceptable, then public server 2022 generates notification 2040 that is sent to scanning device 2024. Alternatively, notification 2040 may be sent to user device 2008 or mobile application 2009. Notification 2040 may include information or a code to scan the document when presented at scanning device 2024. Scanning device 2024 may generate statistics including the costs incurred and any data amounts used for completing the scan job. The image file generated by scanning device 2024 is the electronic document of document 2004, which also may be referred to as document 2004. Scanning device 2024 sends the electronic document for document 2004 to public server 2022. Public server 2022 stores the scanned document for later retrieval by the user. In some embodiments, the scanned document may be forwarded to private server 2012. The statistics generated by the scanning operations are sent to update ledger 2018 accordingly.

In either situation, the scan job may be denied and subsequently cancelled. Policy 2016 may indicate that the scan job is not allowed for the user. The scan job may violate one or more of the parameters set forth in the policy. Further, not enough credit value or quota value may remain to perform the scan job. The user may have reached his/her limits for the policy period and cannot exceed these limits absent some action taking through administrator device 2006. For example, the administrator for the organization using public scan service 2020 may allow a temporary overage situation for the policy period. Thus, notification 2036 or 2040 may be an alert indicating that the document will not be scanned at the applicable scanning device. It also may include instructions to cancel the scan job at the applicable scanning device.

Figure 15:
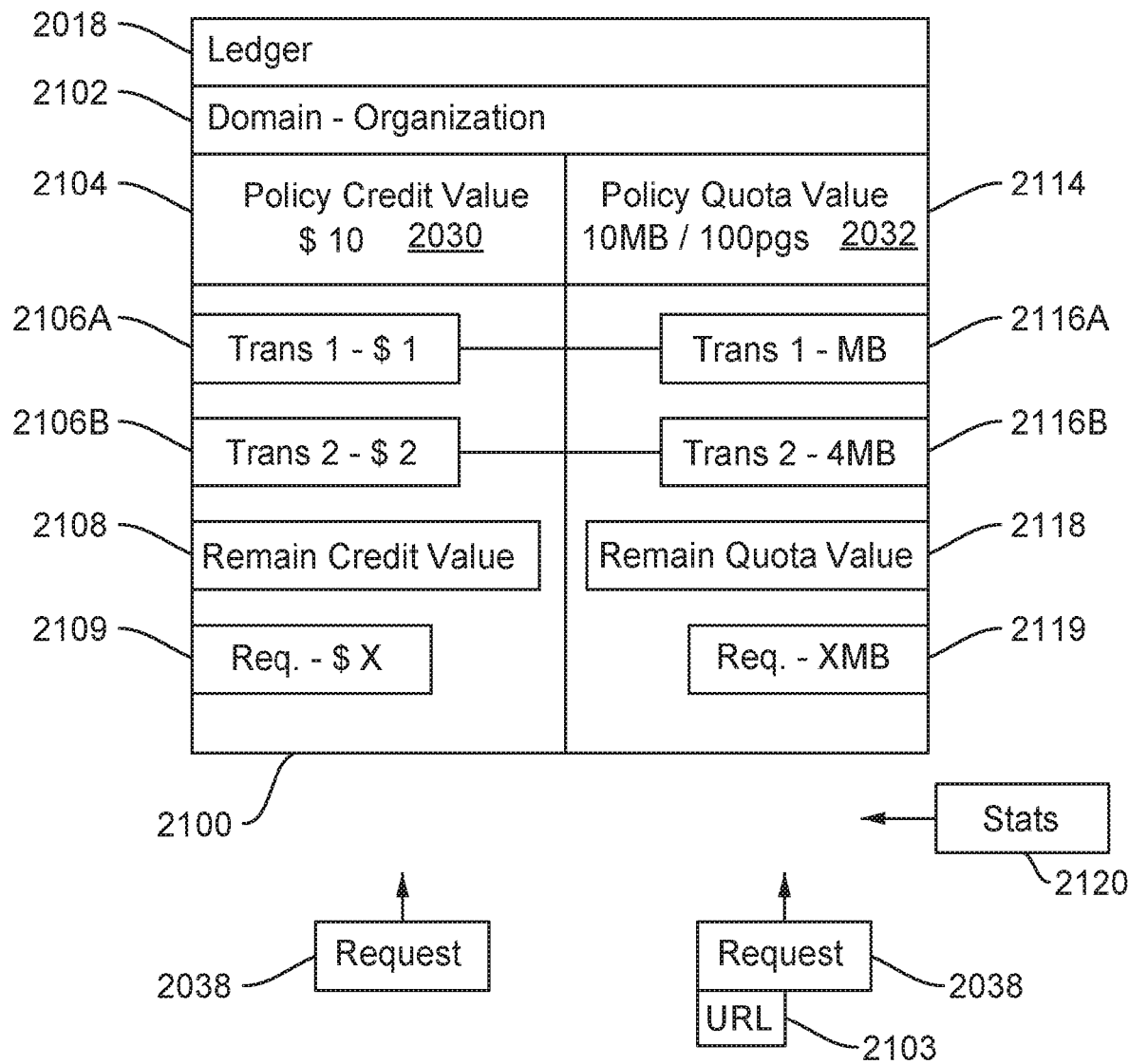
FIG. 15 illustrates a ledger for use in policy-based scanning operations according to the disclosed embodiments.

FIG. 15 depicts ledger 2018 for use in policy-based scanning operations according to the disclosed embodiments. FIG. 15 shows some of the features disclosed above by FIG. 14 in greater detail. Ledger 2018 may store information that is used in determining whether to allow a scan job using office scan service 2010 or public scan service 2020. Ledger 2018 may be a table or file stored on private server 2012 to record transactions generated by the user in office scan service 2010 or public scan service 2012. The fields and entries shown in ledger 2019 are for illustrative purposes only. Other means for storing the information used by ledger 2018 may be used.

Table 2100 may be in ledger 2018 for the user. The user may belong to an organization corresponding to a domain, shown as domain 2102. Domain 2102 may be related to a URL address for private server 2012, and identified using the URL address in a request for a scan job. Domain 2102 may be a field in table 2100 that stores this information. The URL address is used by public server 2022 to identify the appropriate domain to query for scan jobs for the user.

For the user, policy 2016 may be used to limit scan jobs according to certain parameters, such as only black and white scanning, security levels, and the like, as disclosed above. For example, policy 2016 may not allow the user to scan color documents or pictures. One parameter may be costs, as shown in FIG. 4B in that the user may not exceed a certain amount of scanning costs for a policy period. To track incurred costs, ledger 2018 records transactions and adjusts a remaining credit value 2108 for the user. Thus, credit field 2104 includes information to determine the remaining credit value for the user.

Credit field 2104 includes a policy credit value 2030. Policy credit value 2030 may be set by an administrator based on factors, such as the contract with the organization, the access level of the user, budgeted usage, and the like. Policy credit value 2030 may be sent or set at ledger 2018 using administrator device 2006. Policy credit value 2030 is stored in credit field 2104. For the most part, policy credit value 2030 does not change during a policy period. It sets the limit on how much the user may charge to the organization for scanning. In some embodiments, policy credit value 2030 may differ for scanning using office scan service 2010 as opposed to public scan service 2020. Alternatively, policy credit value 2030 may place a limit on all scanning across both services.

Table 2100 also may include fields for parameters that vary over time due to the transactions. These fields include values that are used to determine whether to allow a scan job in office scan service 2010 or public scan service 2020. For illustrative purposes, the features of ledger 2018 will be disclosed as using public scan service 2020. The same features also may apply to scan jobs using office scan service 2010.

Scan jobs for the user results in entries for the transactions being created in credit field 2104. Thus, transactions 2106A and 2106B may reflect two scan jobs already performed for the user during the current policy period. Information for these transactions may include costs, time/date, device identification for the scanning device, whether it is a private or public scan job, and the like. When a request for a new scan job is received, the costs of the transactions are compiled to determining remaining credit value 2108.

For example, policy credit value 2030 may be $10 for a policy period. The user may incur scanning costs up to $10 before requests will be denied. Transaction 2106A incurred a cost of $1 while transaction 2106B incurred a cost of $2. Thus, remaining credit value 2108 is $7. A scan job will be allowed as long as it does not cost more than $7. Ledger 2018 is notified of a pending request for a scan job. In some embodiments, request 2034 is received within office scan service 2010. In other embodiments, request 2038 is received from public scan service 2020. The request may include an estimated transaction 2109 having a cost of $X. If X is $5, then the scan job will be allowed. If X is $8, then the scan job will be denied as it exceeds remaining credit value 2108.

If request 2038 is received in public scan service 2020 at public server 2022, then URL address 2103 may be used to determine which domain 2102 to query with the user's information. Request 2038 may simply be the estimated cost and not the actual cost to scan document 2004. The URL address is determined by public server 2022 based on information provided by the user, such as an email address. The email address will indicate the domain of the user, which then is used to obtain URL address 2103. Determination of domains may be disclosed above by FIG. 4A.

Table 2100 also includes quota field 2114 to determining a remaining quota value 2118 for the user. Quota value may refer to a parameter other than cost to limit scanning operations for the user, such as total data or scanned pages generated for scan jobs during a policy period. For example, the user may be limited to scanning up to 10 MB of data for a policy period. Another example may be limiting the user to scanning 100 pages within a policy period. The data limit may be more applicable when the user is scanning documents having complex graphics or information as opposed to text. Much like policy credit value 2030, policy quota value 2032 is set by policy 2016 or the administrator using administrator device 2006.

Quota field 2114 also includes entries for transactions corresponding to those in credit field 2104. Thus, transaction 2116A corresponds to transaction 2106A and includes the amount of data used to accomplish the scan job. Transaction 2116B corresponds to transaction 2106B. The corresponding transactions may share certain information such as time/data, scanning location, and the like. The determination of remaining quota value 2118 also is determined by compiling the amount of data used in the previous transaction and comparing the compiled amount to policy quota value 2032. Using the above example, transaction 2116A used 2 MB of data while transaction 2116B used 4 MB of data. If using pages, then the number of scanned pages may be compiled. If policy quota value 2032 is 10 MB, then remaining quota value 2118 is 4 MB. The user may scan up to 4 MB of data.

When the request for the new scan job is received, the estimated size of the scan job is shown as estimated transaction 2119. The estimated quota size may be X MB. If X is 2 MB, then the scan job should be allowed. If X is 6 MB, then the scan job will be denied. In some embodiments, if the estimated cost and size of the scan job fails to be within the parameters for remaining credit value 2108 or remaining quota value 2118, then the scan job will not be allowed. Alternatively, if either the estimated cost or size is acceptable, then the scan job may proceed. The appropriate notification may be generated by private server 2012 and sent to the appropriate device, either scanning device 2014 or public server 2022.

After scanning operations are complete, the scanning device performing the scan job will generate statistics 2120 and send them to update ledger 2018. Entries will be made into credit field 2104 and quota field 2114 for the transaction. Statistics 2120 may include the actual cost and size of the scan job, which may differ from the estimated amounts used in determining whether to allow the scan job. Statistics 2120 may be generated for scanning operations using office scan service 2010 and public scan service 2020.

Figure 16:
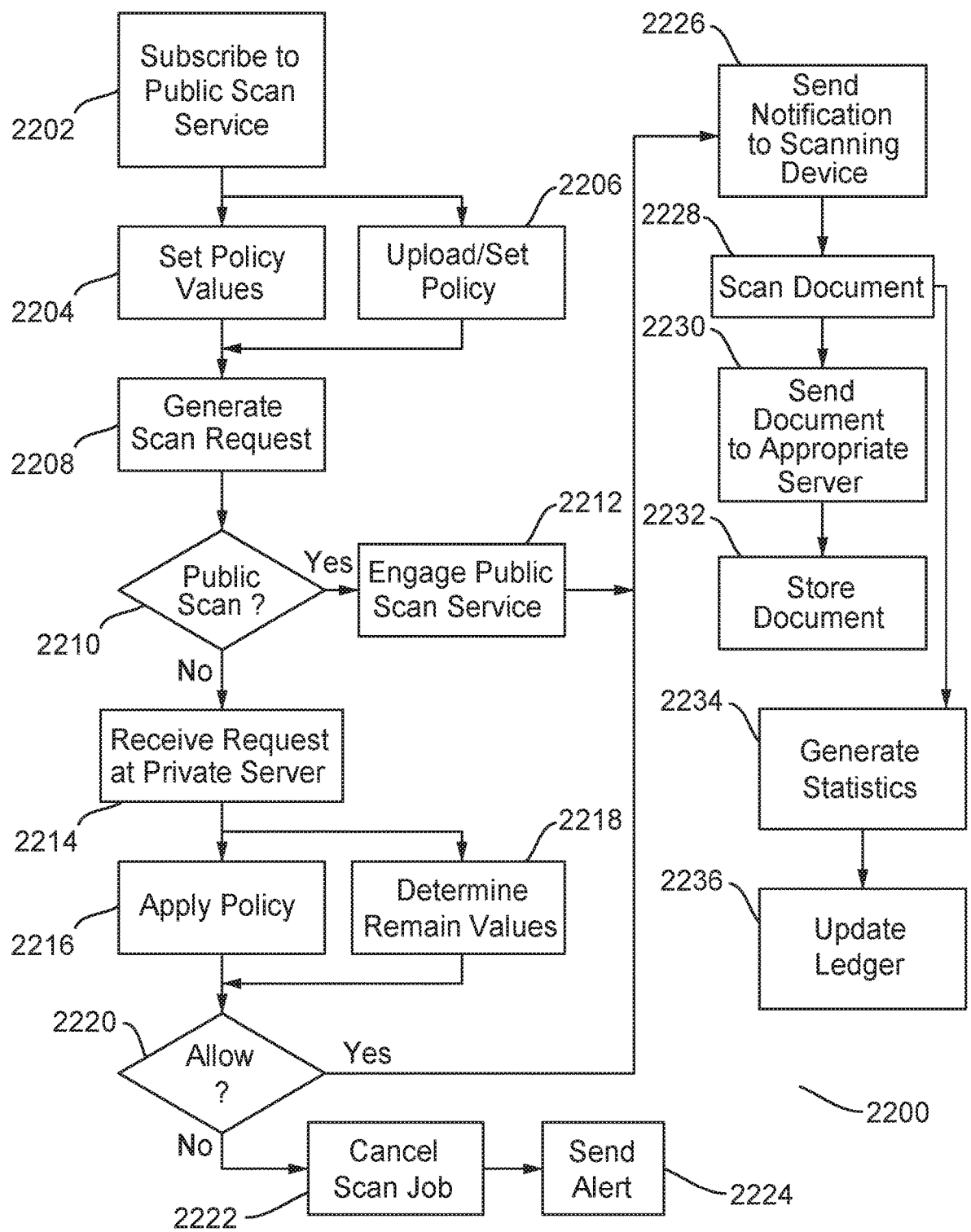
FIG. 16 illustrates a flowchart for scanning a document using the policy-based scanning system according to the disclosed embodiments.

FIG. 16 depicts a flowchart 2200 for scanning a document using policy-based scanning system 2000 according to the disclosed embodiments. The features disclosed by FIGS. 1-15 may be used to illustrate the embodiments of FIG. 16. Flowchart 2200, however, may not be limited by FIGS. 1-15.

Step 2202 executes by subscribing the organization having office scan service 2010 to public scan service 2020. Public scan service 2020 may have relationships with several office scan services. Public scan service 2020 also allows a user of office scan service 2010 to have access to a large number of scanning devices in the public domain. The users within the organization may have access to scanning devices outside office scan services 2010. This step also includes the organization of office scan services 2010 providing information including a URL address or addresses for any private servers to be accessed during scanning operations. For example, the subscription action may include URL address 2103 for private server 2012. Email addresses having the same domain as URL address 2103 may be verified using the appropriate policy of the corresponding private server.

Step 2204 executes by uploading or setting policy 2016 at private server 2012. Policy 2016 may be applied to scan jobs to allow or deny them according to the parameters in the policy. A policy may apply to a user, but also may be set for the organization. Step 2206 executes by setting policy values for the user or the organization. For example, a policy credit value 2030 and a policy quota value 2032 may be set for a policy period. The user may not exceed these values for scan jobs in the policy period. An administrator may set these values. Alternatively, the values may be set in policy 2016.

Step 2208 executes by generating request 2034 or 2038 to scan a document at a scanning device. The user may request to scan document 2002 at scanning device 2014 or document 2004 at scanning device 2024. Thus, the request may be generated at either device, depending on which scan service to use. The request may be submitted at the scanning device by the user or sent to the scanning device from user device 2008. The user may launch mobile application 2009 to request a scan job. The request may include a user name and password to verify the user within the appropriate scan service. The user may enter this information at the scanning device or send it using user device 2008. The user information is validated. If the user information is not valid, then the scanning device may indicate this to the user and request that the information be re-entered. Otherwise, the scanning operations may be stopped.

Step 2210 executes by determining whether a possible scan job will be a public scan job. In other words, if the user wishes to scan a document, then flowchart 2200 determines whether it is to be done using public scan service 2020. For example, a request 2034 indicates a scan job using office scan server 2010. A request 2038 indicates a scan job using public scan service 2020. If yes, then step 2212 executes by engaging public scan service 2020. Public scan service 2020 may be a cloud-based platform that connects public servers and scanning devices in the public domain. Step 2210 is disclosed in greater detail by FIG. 17.

If step 2208 is no, then the scan job is to be performed in the private domain, or office scan service 2010. The remaining steps should correspond to policy-based scanning in the organization of the user. Step 2214 executes by receiving request 2034 to scan document 2002 at private server 2012. Private server 2012 may use information provided by the user to determine which policy corresponds to the scan job.

Step 1216 executes by applying policy 2016 to the scan job for document 2002. As disclosed above by FIGS. 3 and 6-9, the policy is used to determine whether the parameters for the scan job are acceptable. These same features may be applied to determine whether a scan job is acceptable. For example, document 2002 may include color graphics but policy 2016 does not allow the user to scan documents having color features. Alternatively, the scanned image may not include data for color imaging. Thus, policy 2016 will not allow the scan job for document 2002 or may allow it to proceed under certain restrictions.

Step 2218 executes by determining the remaining values for the user based on the transactions already performed for the policy period. For example, remaining credit value 2108 is determined, as disclosed above. Policy credit value 2030 is used to determine remaining credit value 2108. If applicable, then remaining quota value 2118 also may be determined. The scan job for document 2002 may not exceed any remaining values for the user.

Step 2220 executes by determining whether to allow the scan job of document 2002 within office scan service 2010. In this step, the application of policy 2016 and the remaining values are used. Failure to meet both criteria may result in the scan job not being allowed. For example, the scan job may be allowed according to policy 2016 but not enough remaining credit value 2108 is left to pay for the scan job or not enough remaining quota value is available to process the scan job. Alternatively, enough remaining credit or quota is available to scan document 2002 but the scan job is not allowed according to policy 2016. The scan job is allowed if it meets both requirements set forth by policy 2016 and the remaining values according to ledger 2018.

If step 2220 is no, then step 2222 executes by cancelling the scan job within office scan services 2010. Private server 2012 denies access to document 2002. Step 2224 executes by sending an alert to scanning device 2014. The alert may be notification 2036. The alert also may be sent to user device 2008 to notify the user so that he/she may take some action to still scan document 2002.

If step 2220 is yes, then document 2002 may be scanned using office scan service 2010. Step 2226 executes by sending notification 2036 to scanning device 2014. Step 2228 executes by scanning document 2002 at scanning device 2014. An image file is generated by the scanning operations. The image file may be an electronic document of document 2002. Step 2230 executes by sending the electronic document for document 2002 to private server 2012. Step 2234 executes by generating statistics 2120 for the scan job at scanning device 2014. The statistics are sent to ledger 2018 on private server 2012. Step 2236 executes by updating ledger 2018 with statistics 2120. An entry may be made in ledger 2018 for the transaction information associated with the scan job, such as cost, data size, time/date, and the like.

It should be noted that steps 2226-36 also are executed for a scan job using public scan service 2020, with slight modifications as disclosed below.

FIG. 17 depicts a flowchart 2300 for scanning a document using public scan service 2020 according to the disclosed embodiments. The features disclosed by FIGS. 1-16 may be used to illustrate the embodiments of FIG. 17. Flowchart 2300, however, may not be limited by FIGS. 1-16.

In step 2210 of flowchart 2200, it was determined that the scanning operations are to be performed by public scan service 2020. The user may be outside the office environment and not able to access office scan service 2010. Office scan service 2010 subscribes to public scan service 2020 so that its users may scan documents using the public scanning devices available within the public scan service. Thus, the user scans document 2004 on scanning device 2024. The user also may store document 2004 on public server 2022 for access within public scan service 2020. In some embodiments, document 2004 may be sent to user device 2008 instead. The user can decide whether to store the scanned document on public server 2022. Alternatively, the scanned document is forwarded to private server 2012 for use within office scan services 2010.

Step 2302 executes by receiving request 2038 at public server 2022. The request may include user information such as organization name, email, user name, password, and the like. As disclosed above, request 2038 may be generated at scanning device 2024 in public scan service 2020. In other embodiments, request 2038 may be generated at user device 2008. The user may use mobile application 2009 to select scanning operations for document 2004 at a public scanning device. Mobile application 2009 generates request 2038 along with the user information available to the application. Thus, step 2302 may execute, if applicable, by receiving request 2038 to scan document 2004 at scanning device 2024. Alternatively, the user may use a kiosk to request a scan job for the document. Public server 2022 may verify that request 1038 is valid and within public scan service 2020. Public server 2020 also may note that the scan job is to be performed at scanning device 2024.

Step 2304 executes by analyzing the user information in request 2038. Public server 2022 may verify that the user name and password are correct for the user. It also may use this information to determine an email address for the user. Step 2306 executes by determining the applicable domain for the user. As disclosed above in FIG. 4A, the domain may determine which private server 2012 to access and the corresponding policy to apply. Public server 2022 may use the email address for the user to identify the domain. The domain also may identify that office scan service 2010 is subscribed to public scan service 2020. Scanning operations for the user would normally occur using office scan service 2010 as well as the rules that apply to those operations in policy 2016.

Using the domain information, step 2308 executes by searching for organization information. Organization information may include name of organization and associated URL addresses for the private server therewithin. Public server 2022 also may apply any policy limitations available at this point. Once the organization is determined, public server 2022 may apply some general rules to request 2038, such as no scanning on weekends or after business hours, and the like. Step 2310 executes by determining URL address 2103 for private server 2012 of office scan service 2010 in the organization information. Alternatively, the disclosed embodiments may use the email address of the user to search URL addresses for organizations serviced by public scan service 2020.

Step 2312 executes by sending request 2038 and the user information to private server 2012 at URL address 2103. As the service is a cloud-based service, private server 2012 may be identified by its URL address. Public server 2022 sends the request and information over the network and outside public scan service 2020. Upon receipt of request 2038, private server 2012 may operate much like it did for scan jobs using office scan service 2010.

Step 2314 executes by applying policy 2016 to the scan job request for document 2004. Step 2316 also executes by determining the remaining values for the credit and quota parameters as well. These steps may correspond to steps 2216 and 2218 in flowchart 2200. Ledger 2018 may be used to determine remaining credit value 2108 and remaining quota value 2118.

Step 2318 executes by determining whether to allow the scan job for document 2004 at scanning device 2024. In some embodiments, private server 2012 may make this determination by making sure the scan job meets the requirements set forth in policy 2016 and that enough remaining credit or quota value is available to process the scan job. Alternatively, public server 2022 may make this determination. Policy 2016 may be sent to public server 2022 to apply it to the scan job. Further, remaining credit value 2108 and remaining quota value 2118 may be forwarded to public server 2022. In other embodiments, only the remaining values are sent to public server 2022 while policy 2016 is applied at private server 2012. This process may be preferred as public server 2022 may retain the estimated cost and data size of the scan job as opposed to sending it to office scan service 2010. Public server 2022 further may keep data to calculate the estimated cost and data size for the scan job.

If step 2318 is no, then step 2324 executes by cancelling the scan job, much like step 2222 disclosed above. Public server 2022 may flag further scan job requests from the user and deny them as well until a communication is received from office scan service 2010 to allow the user to use public scan service 2020. Step 2326 executes by sending an alert or notification 2040 to the user. Notification 2040 may be sent to user device 2008. Mobile application 2009 may display the alert on user device 2008. Alternatively, notification 2040 may be sent to scanning device 2024 to display to the user and cancel scanning operations.

If step 2318 is yes, then step 2320 executes by sending notification 2040 to public server 2022, if the determination is done at private server 2012. If the determination is performed at public server 2022, then public server 2022 generates notification 2040. Step 2322 executes by returning to flowchart 2200. The remaining steps are similar to the ones performed for scanning in office scan service 2010 with some differences, disclosed below. Step 2324 executes steps 2226 to 2236 to implement scanning in public scan service 2020 following the below disclosed embodiments.

Returning back to flowchart 2200 to execute steps 2226 to 2236 in a public scan service 2020, step 2226 executes by sending notification 2040 to scanning device 2024. Notification 2040 may operate as notification 2036 disclosed above. It may include a code for the user to enter onto scanning device 2024 to commence scanning operations for document 2004. Step 2228 executes by scanning document 2004 at scanning device 2024. Scanning device 2024 completes the scan job and generates an image file of document 2004. The image file may be an electronic document of document 2004 but also referred to as document 2004 for brevity. Scanning device 2024 may store the image file as well as make it available to the user to review.

Step 2230 executes by sending the electronic document from scanning device 2024 to public server 2022. Public server 2022 also may forward the electronic document to private server 2012 for storing in office scan server 2010. The user may want to keep a copy of document 2004 at the company or organization for retrieval later. Public server 2022 may send the scanned document to the URL address for private server 2012 in a cloud-based service. Public server 2022 also may forward the scanned document to user device 2008. The user may view the scanned document on user device 2008. Mobile application 2009 also may allow the user to modify or manage the scanned document. Step 2232 executes by storing the scanned document at public server 2022. Further, the scanned document may be stored at another server, such as private server 2012.

Step 2234 executes by generating statistics 2120 for the scan job. Step 2236 executes by updating ledger 2018 with statistics 2120. These steps are disclosed above. Public server 2022 also may store and use statistics 2120 in generating reports from public scan service 2020.

Thus, a policy-based scanning system may be used with an office scanning service and a public scanning service. Both services may be implemented using cloud-based servers that communicate with scanning devices. The public scan service includes a server that manages document flow using a policy and remaining credit and quota values. The user may scan using a public scan service without unduly causing high costs or violating the scanning policy of an organization using the office scan service.

In a first alternate embodiment, a policy-based scanning method includes receiving a request with information for a scan job for a document at a public server from a scanning device, wherein the information corresponds to a user within an organization;

determining a domain for the organization based on the information;

applying a policy at a private server for the organization according to the domain;

determining a remaining credit value for the user using a ledger at the private server;

determining whether to allow the scan job of the document based on the policy and if the remaining credit value is greater than a cost for the scan job;

receiving a notification to proceed with the scan job of the document at the scanning device based on the determination whether to allow; and scanning the document at the scanning device.

The first alternate embodiment also includes determining the remaining credit value at the private server based on a policy credit value.

The first alternate embodiment also includes generating statistics including the cost for the scan job and sending the statistics to the private server.

The first alternate embodiment also includes updating the ledger at the private server with the statistics.

The first alternate embodiment also includes sending the document from the scanning device to the public server after the scanning.

The first alternate embodiment also includes using the private server to subscribe to a public scan service at the public server.

The first alternate embodiment also includes sending the document from the public server to the private server connected to the public scan service.

The first alternate embodiment also includes that the information includes an email address for the user.

The first alternate embodiment also includes determining a uniform resource locator (URL) address for the private server from the email address.

The first alternate embodiment also includes directing the request to the URL address for the private server.

In a second alternate embodiment, a policy-based scanning method includes receiving a request with information for a scan job of a document at a scanning device, wherein the information corresponds to a user within an organization;

determining whether the scan job is through a public scan service connected to the scanning device;

if the scan job is through the public scan service, processing the request for the scan job at a public server by determining a domain for the organization based on the information, applying a policy and a remaining credit value for the organization according to the domain, determining whether to allow the scan job of the document based on the policy and the remaining credit value, and sending a notification to the public server to proceed with the scan job of the document at the scanning device based on the determination whether to allow;

if the scan job is not through the public scan service, processing the scan job at a private server by
applying the policy at the private server for the organization,
determining whether to allow the scan job of the document based on the policy, and
instructing the scanning device to proceed with the scan job based on the determination whether to allow; and
scanning the document at the scanning device.

The second alternate embodiment also includes determining the remaining credit value for the organization according to a policy credit value at the private server.

The second alternate embodiment also includes generating statistics for the scan job of the document at the scanning device.

The second alternate embodiment also includes updating a ledger at the private server with the statistics.

The second alternate embodiment also includes that the information includes an email address for the user.

The second alternate embodiment also includes determining an uniform resource locator (URL) address for the private server based on the email address.

In a third alternate embodiment, a policy-based scanning system includes
a scanning device to scan a document;
a public server to support a public scan service for an organization, wherein the public server is configured to receive a request for a scan job for the document from the scanning device; and
a private server connected to the public server, wherein the private server includes a policy and a ledger to store a remaining credit value for the organization,
wherein the private server is configured to apply the policy to allow the scan job and the remaining credit value for the scan job using the public scan service,
wherein the public server is configured to receive the document from the scanning device if the scan job is allowed by the policy and the remaining credit value.

The third alternate embodiment also includes that the public server is configured to cancel the scan job if the scan job is not allowed by the policy or the remaining credit value.

The third alternate embodiment also includes that the policy includes a policy credit value and that the remaining credit value is based on the policy credit value.

The third alternate embodiment also includes a user device to send the request to the scanning device or the public server.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more multi-functional printer (MFP) systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A policy-based scanning method comprising:
   receiving a request with information for a scan job for a document at a cloud-based public server within a cloud-based public scan service, wherein the information corresponds to a user within an organization;
   determining a domain for the organization based on the information;
   applying a policy for the organization at the public server according to the domain;
   determining a remaining credit value for the user using a ledger at the public server;
   determining whether to allow the scan job of the document based on the policy and if the remaining credit value is greater than a cost for the scan job within the public scan service;
   receiving a notification to proceed with the scan job of the document at a scanning device based on the determination whether to allow; and
   scanning the document at the scanning device.

2. The policy-based scanning method of claim 1, further comprising determining the remaining credit value at the public server based on a policy credit value.

3. The policy-based scanning method of claim 1, further comprising generating statistics including the cost for the scan job at the scanning device and sending the statistics to the public server.

4. The policy-based scanning method of claim 3, further comprising updating the ledger at the public server with the statistics.

5. The policy-based scanning method of claim 1, further comprising uploading the document to the public server from the scanning device using the public scan service.

6. The policy-based scanning method of claim 1, further comprising subscribing to the public scan service at the public server.

7. The policy-based scanning method of claim 1, further comprising sending the notification from the public server to a user device connected to the public scan service.

8. The policy-based scanning method of claim 1, wherein the information includes an email address for the user.

9. The policy-based scanning method of claim 8, further comprising determining a uniform resource locator (URL) address from the email address.

10. The policy-based scanning method of claim 9, further comprising using the URL address to determine the domain for the user.

11. A policy-based scanning method comprising:
    accessing a cloud-based public scan service;
    receiving a request with information for a scan job of a document at a cloud-based public server connected to the public scan service, wherein the information corresponds to a user within an organization;
    processing the request for the scan job at the public server by
       determining a domain for the organization based on the information,
       applying a policy and a remaining credit value to the scan job for the organization within the public scan service according to the domain,
       determining whether to allow the scan job within the public scan service of the document based on the policy and the remaining credit value, and
       sending a notification to a scanning device to proceed with the scan job of the document using the public scan service based on the determination whether to allow; and
    scanning the document at the scanning device.

12. The policy-based scanning method of claim 11, further comprising determining the remaining credit value for the organization according to a policy credit value at the public server.

13. The policy-based scanning method of claim 11, further comprising generating statistics for the scan job of the document at the scanning device.

14. The policy-based scanning method of claim 13, further comprising updating a ledger at the public server with the statistics.

15. The policy-based scanning method of claim 11, wherein the information includes an email address for the user.

16. The policy-based scanning method of claim 15, further comprising determining a uniform resource locator (URL) address for the domain based on the email address.

17. A policy-based scanning system comprising:
- a cloud-based public scan service connected to a scanning device to scan a document;
- a cloud-based public server within the public scanning service,
- wherein the public server is configured to receive a request for a scan job for the document,
- wherein the public server includes a policy and a ledger to store a remaining credit value for an organization subscribed to the public scan service,
- wherein the public server is configured to apply the policy and the remaining credit value to allow the scan job using the public scanning service, and
- wherein the public server is configured to receive the document from the scanning device if the scan job is allowed by the policy and the remaining credit value; and
- wherein the scanning device is configured to scan the document upon receipt of a notification from the public server.

18. The policy-based scanning system of claim 17, wherein the public server is configured to cancel the scan job if the scan job is not allowed by the policy or the remaining credit value.

19. The policy-based scanning system of claim 17, wherein the policy includes a policy credit value and that the remaining credit value is based on the policy credit value.

20. The policy-based scanning system of claim 17, further comprising a user device to send the request to the scanning device or the public server.

* * * * *